US011831867B2

(12) United States Patent
Cricri et al.

(10) Patent No.: US 11,831,867 B2
(45) Date of Patent: Nov. 28, 2023

(54) APPARATUS, A METHOD AND A COMPUTER PROGRAM FOR VIDEO CODING AND DECODING

(71) Applicant: Nokia Technologies Oy, Espoo (FI)

(72) Inventors: Francesco Cricri, Tampere (FI); Caglar Aytekin, Tampere (FI); Miska Hannuksela, Tampere (FI); Xingyang Ni, Tampere (FI)

(73) Assignee: Nokia Technologies Oy, Espoo (FI)

( * ) Notice: Subject to any disclaimer, the term of this patent is extended or adjusted under 35 U.S.C. 154(b) by 320 days.

(21) Appl. No.: 17/430,893

(22) PCT Filed: Jan. 29, 2020

(86) PCT No.: PCT/FI2020/050047
§ 371 (c)(1),
(2) Date: Aug. 13, 2021

(87) PCT Pub. No.: WO2020/165493
PCT Pub. Date: Aug. 20, 2020

(65) Prior Publication Data
US 2022/0141455 A1   May 5, 2022

(30) Foreign Application Priority Data
Feb. 15, 2019   (FI) .................................. 20195115

(51) Int. Cl.
*H04N 7/12* (2006.01)
*H04N 19/11* (2014.01)
(Continued)

(52) U.S. Cl.
CPC ............. *H04N 19/11* (2014.11); *G06N 3/045* (2023.01); *G06N 3/08* (2013.01); *H04N 19/159* (2014.11); *H04N 19/176* (2014.11); *H04N 19/85* (2014.11)

(58) Field of Classification Search
CPC .... H04N 19/11; H04N 19/159; H04N 19/176; H04N 19/174; H04N 19/192;
(Continued)

(56) References Cited

U.S. PATENT DOCUMENTS

| 9,800,893 B2 | 10/2017 | Lainema et al. |
| 2009/0180534 A1* | 7/2009 | Hluchyj ........... H04N 21/44004 375/E7.126 |

(Continued)

FOREIGN PATENT DOCUMENTS

| JP | 2018-125713 A | 8/2018 |
| WO | 2017/036370 A1 | 3/2017 |

(Continued)

OTHER PUBLICATIONS

Office action received far corresponding Indian Patent Application No. 202147040987, dated Dec. 8, 2022, 5 pages.

(Continued)

*Primary Examiner* — Gims S Philippe
(74) *Attorney, Agent, or Firm* — Nokia Technologies Oy

(57) ABSTRACT

A method comprising: obtaining a configuration of at least one neural network comprising a plurality of intra-prediction mode agnostic layers and one or more intra-prediction mode specific layers, the one or more intra-prediction mode specific layers corresponding to different intra-prediction modes; obtaining at least one input video frame comprising a plurality of blocks; determining to encode one or more blocks using intra prediction; determining an intra-prediction mode for each of said one or more blocks; grouping blocks having same intra-prediction mode into groups, each group being assigned with a computation path among the plurality of intra-prediction mode agnostic and the one or more intra-prediction mode specific layers; training the plurality of intra-prediction mode agnostic and/or the one or (Continued)

more intra-prediction mode specific layers of the neural networks based on a training loss between an output of the neural networks relating to a group of blocks and ground-truth blocks, wherein the ground-truth blocks are either blocks of the input video frame or reconstructed blocks; and encoding a block using a computation path assigned to an intra-prediction mode for the block.

20 Claims, 7 Drawing Sheets

(51) Int. Cl.
| | |
|---|---|
| H04N 19/159 | (2014.01) |
| H04N 19/176 | (2014.01) |
| H04N 19/85 | (2014.01) |
| G06N 3/08 | (2023.01) |
| G06N 3/045 | (2023.01) |

(58) Field of Classification Search
CPC ...... H04N 19/593; H04N 19/85; G06N 3/045; G06N 3/08; G06N 3/044; G06N 3/04
USPC .................................................. 375/375.02
See application file for complete search history.

(56) References Cited

U.S. PATENT DOCUMENTS

| | | | |
|---|---|---|---|
| 2016/0219024 A1* | 7/2016 | Verzun | H04L 9/34 |
| 2017/0347110 A1 | 11/2017 | Wang et al. | |
| 2018/0184123 A1 | 6/2018 | Terada et al. | |
| 2018/0249158 A1 | 8/2018 | Huang et al. | |
| 2020/0193296 A1* | 6/2020 | Dixit | G06N 3/045 |
| 2020/0210523 A1* | 7/2020 | Aghajanyan | G06N 3/044 |

FOREIGN PATENT DOCUMENTS

| | | |
|---|---|---|
| WO | 2018/150083 A1 | 8/2018 |
| WO | 2019/009491 A1 | 1/2019 |
| WO | 2019/115865 A1 | 6/2019 |
| WO | 2019/197712 A1 | 10/2019 |

OTHER PUBLICATIONS

Extended European Search Report received for corresponding European Patent Application No. 20755980.8, dated Oct. 26, 2022, 11 pages.
Cricri et al., "Use cases for Neural Network Representations", Nokia Technologies Oy, ISO/IEC JTC1/SC29/WG11MPEG2018/m42563, Apr. 2018, 9 pages.
Simonyan et al., "Two-Stream Convolutional Networks for Action Recognition in Videos", Proceedings of the 27th International Conference on Neural Information Processing Systems, 2014, pp. 1-9.
Birman et al., "Intra prediction with deep learning", Applications of Digital Image Processing XLI, SPIE, vol. 10752, 2018, pp. 1075214-1-1075214-9.
Li et al., "Fully Connected Network-Based Intra Prediction for Image Coding", IEEE Transactions on Image Processing, vol. 27, No. 7, Jul. 2018, pp. 3236-3247.
Zhang et al., "Combining Intra Block Copy and Neighboring Samples Using Convolutional Neural Network for Image Coding", IEEE Visual Communications and Image Processing (VCIP), Dec. 9-12, 2018, 4 pages.
"Versatile Video Coding", Series H: Audiovisual and Multimedia Systems Infrastructure of audiovisual services—Coding of moving video, Recommendation ITU-T H.266, Aug. 2020, 516 pages.
Pfaff et al., "Intra prediction modes based on neural networks", Joint Video Experts Team (JVET) of ITU-T SG 16 WP 3 and ISO/IEC JTC 1/SC 29/WG 11, 10th Meeting, JVET-J0037-v1, Apr. 10-20, 2018, 33 pages.
"Information Technolog—Generic Coding of Moving Pictures and Associated Audio Information: Systems", Series H: Audiovisual and Multimedia Systems, Infrastructure of Audiovisual Services—Transmission Multiplexing and Synchronization, Recommendation ITU-T H.222, Mar. 2017, 291 pages.
"Information Technology—Coding Of Audio-Visual Objects—Part 12: ISO Base Media File Format", ISO/IEC 14496-12, Fifth edition, Dec. 15, 2015, 248 pages.
"Information Technology—Coding Of Audio-Visual Objects—Part 15: Advanced Video Coding (AVC) File Format", ISO/IEC 14496-15, First edition, Apr. 15, 2004, 29 pages.
"Video Coding For Low Bit Rate Communication", Series H: Audiovisual And Multimedia Systems, Infrastructure of audiovisual services—Coding of moving Video, ITU-T Recommendation H.263, Jan. 2005, 226 pages.
"Advanced Video Coding For Generic Audiovisual services", Series H: Audiovisual And Multimedia Systems, Infrastructure of audiovisual services—Coding of moving Video, Recommendation ITU-T H.264, Apr. 2017, 812 pages.
"High Efficiency Video Coding", Series H: Audiovisual And Multimedia Systems, Infrastructure of audiovisual services—Coding of moving video, Recommendation ITU-T H.265, Feb. 2018, 692 pages.
"Parameter Values for Ultra-High Definition Television Systems for Production And International Programme Exchange", Recommendation ITU-R BT.2020, Aug. 2012, 7 pages.
"Parameter Values for the HDTV Standards for Production and International Programme Exchange", Recommendation ITU-R BT.709-6, Jun. 2015, 19 pages.
Office action received for corresponding Finnish Patent Application No. 20195115, dated Oct. 7, 2019, 10 pages.
Ruder, "An Overview of Multi-Task Learning in Deep Neural Networks", arXiv, Jun. 15, 2017, pp. 1-14.
International Search Report and Written Opinion received for corresponding Patent Cooperation Treaty Application No. PCT/FI2020/050047, dated Apr. 30, 2020, 16 pages.
Caruana, "Multitask Learning: A Knowledge-Based Source of Inductive Bias", Proceedings of the Tenth International Conference on Machine Learning, Jul. 1993, 8 pages.
Cui et al., "Convolutional Neural Networks based Intra Prediction for HEVC", Data Compression Conference (DCC), Apr. 4-7, 2017, 10 pages.
Hensman, "Intra-prediction for Video Coding with Neural Networks", Thesis, Mar. 3, 2018, 68 pages.

\* cited by examiner

APPARATUS, A METHOD AND A COMPUTER PROGRAM FOR VIDEO CODING AND DECODING

RELATED APPLICATION

This application was originally filed as PCT Application No. PCT/FI2020/050047, filed on Jan. 29, 2020 which claims priority from Finland Application No. 20195115, filed on Feb. 15, 2019, each of which is incorporated herein by reference in its entirety.

TECHNICAL FIELD

The present invention relates to an apparatus, a method and a computer program for video coding and decoding.

BACKGROUND

The so-called hybrid video compression is based on performing intra- and inter-prediction and then transform-coding the residual or prediction error. In intra-mode, a block of a video frame is predicted from spatially-nearby blocks of the same frame. Then, only the prediction error or residual between the intra-predicted block and the original block needs to be encoded. The intra-prediction processes are performed, besides at the decoder, but also in the encoder, more specifically in the "decoding loop" of the encoder, in order to compute the residual.

The intra-prediction process is usually performed using algorithmic approaches (i.e., not using learned approaches). Intra-prediction typically involves a plurality of predefined prediction modes, where during encoding, for a block to be predicted all or several prediction modes are tried, and the most suitable prediction mode for said block is selected, for example based on the mean squared error (MSE) between the predicted block and the real block.

The goal of the intra-prediction process is to obtain the smallest possible prediction error or residual, thus requiring less bits to encode the intra frames which consume a significant part of the entire video's bitstream. However, the above-described algorithmic approach has been subject to such an ultimate studying and development that it has saturated in terms of prediction accuracy. Therefore, further development could be achieved using learned approaches.

SUMMARY

Now in order to at least alleviate the above problems, an enhanced encoding method is introduced herein.

A method according to a first aspect comprises obtaining a configuration of at least one neural network comprising a plurality of intra-prediction mode agnostic layers and one or more intra-prediction mode specific layers, the one or more intra-prediction mode specific layers corresponding to different intra-prediction modes; obtaining at least one input video frame comprising a plurality of blocks; determining to encode one or more blocks using intra prediction; determining an intra-prediction mode for each of said one or more blocks; grouping blocks having same intra-prediction mode into groups, each group being assigned with a computation path among the plurality of intra-prediction mode agnostic and the one or more intra-prediction mode specific layers; training the plurality of intra-prediction mode agnostic and/or the one or more intra-prediction mode specific layers of the neural networks based on a training loss between an output of the neural networks relating to a group of blocks and ground-truth blocks, wherein the ground-truth blocks are either blocks of the input video frame or reconstructed blocks; and encoding a block using a computation path assigned to an intra-prediction mode for the block.

A second aspect relates to an apparatus comprising means for obtaining a configuration of at least one neural network comprising a plurality of intra-prediction mode agnostic layers and one or more intra-prediction mode specific layers, the one or more intra-prediction mode specific layers corresponding to different intra-prediction modes; means for obtaining at least one input video frame comprising a plurality of blocks; means for determining to encode one or more blocks using intra prediction; means for determining an intra-prediction mode for each of said one or more blocks; means for grouping blocks having same intra-prediction mode into groups, each group being assigned with a computation path among the plurality of intra-prediction mode agnostic and the one or more intra-prediction mode specific layers; means for training the plurality of intra-prediction mode agnostic and/or the one or more intra-prediction mode specific layers of the neural networks based on a training loss between an output of the neural networks relating to a group of blocks and ground-truth blocks, wherein the ground-truth blocks are either blocks of the input video frame or reconstructed blocks; and means for encoding a block using a computation path assigned to an intra-prediction mode for the block.

According to an embodiment, the configuration of at least one neural network comprises a pre-trained neural network, and the apparatus further comprises means for using blocks of the input video frame as the ground-truth blocks.

According to an embodiment, the apparatus further comprises means for indicating, in or along a bitstream comprising the encoded group of blocks, information indicative of a group of blocks defined as training blocks.

According to an embodiment, the configuration of neural networks comprises a mode agnostic section of layer(s) and a mode specific section of layer(s).

According to an embodiment, the configuration of neural networks comprises an initial section of initial layers which are trained for a plurality of intra-prediction modes, and several final layers which are specific to each intra-prediction mode.

According to an embodiment, the configuration of neural networks comprises a plurality of different neural networks for different intra-prediction modes.

According to an embodiment, a first learning rate is used in training the intra-prediction mode agnostic layers and a second learning rate is used for training the intra-prediction mode specific layers, and wherein the second learning rate is lower than the first learning rate.

According to an embodiment, the information indicative of the group of blocks defined as training blocks comprises a quantization parameter, wherein the group of blocks is defined as a training block if the quantization parameter is lower than or equal to a threshold.

According to an embodiment, an input to the neural network comprises a plurality of reconstructed blocks of the input video frame.

According to an embodiment, an epoch or an iteration of the training the plurality of intra-prediction mode agnostic layers and/or the one or more intra-prediction mode specific layers is based on blocks associated with a plurality of intra-prediction modes.

A third aspect relates to a method comprising obtaining a configuration of at least one neural network comprising a plurality of intra-prediction mode agnostic layers and one or more intra-prediction mode specific layers corresponding to different intra-prediction modes; obtaining a bitstream comprising an encoded video frame, wherein the encoded video frame comprises a plurality of blocks; decoding, from or along the bitstream information indicative of a group of blocks defined as training blocks; decoding the training blocks into reconstructed blocks; training the plurality of intra-prediction mode agnostic layers and/or the one or more intra-prediction mode specific layers of the neural networks based on a training loss between an output of the neural networks relating to a group of blocks and the reconstructed blocks; and decoding an encoded block using a computation path assigned to an intra-prediction mode of the encoded block.

A fourth aspect relates to an apparatus comprising means for obtaining a configuration of at least one neural network comprising a plurality of intra-prediction mode agnostic layers and one or more intra-prediction mode specific layers corresponding to different intra-prediction modes; means for obtaining a bitstream comprising an encoded video frame, wherein the encoded video frame comprises a plurality of blocks; means for decoding, from or along the bitstream information indicative of a group of blocks defined as training blocks; means for decoding the training blocks into reconstructed blocks; means for training the plurality of intra-prediction mode agnostic layers and/or the one or more intra-prediction mode specific layers of the neural networks based on a training loss between an output of the neural networks relating to a group of blocks and the reconstructed blocks; and means for decoding an encoded block using a computation path assigned to an intra-prediction mode of the encoded block.

Apparatuses according to a fifth and a sixth aspect comprise at least one processor and at least one memory, said at least one memory stored with code thereon, the at least one memory and the computer program code configured to, with the at least one processor, cause the apparatus to perform the method.

According to a further aspect, there is provided a computer readable non-transitory storage medium stored with code thereon for use by an apparatus, which when executed by a processor, causes the apparatus to perform the method.

The apparatuses and the computer readable storage mediums stored with code thereon, as described above, are thus arranged to carry out the above methods and one or more of the embodiments related thereto.

Further aspects relate to apparatuses comprising means for performing the above methods and one or more of the embodiments related thereto.

BRIEF DESCRIPTION OF THE DRAWINGS

For better understanding of the present invention, reference will now be made by way of example to the accompanying drawings in which.

DETAILED DESCRIPTION OF SOME EXAMPLE EMBODIMENTS

Figure 1:
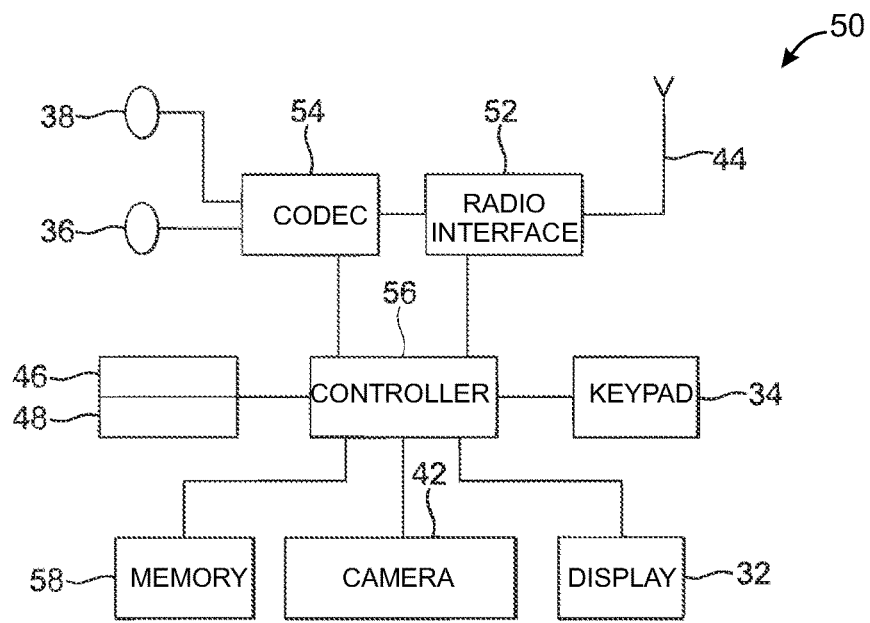
FIG. 1 shows schematically an electronic device employing embodiments of the invention.
Figure 2:
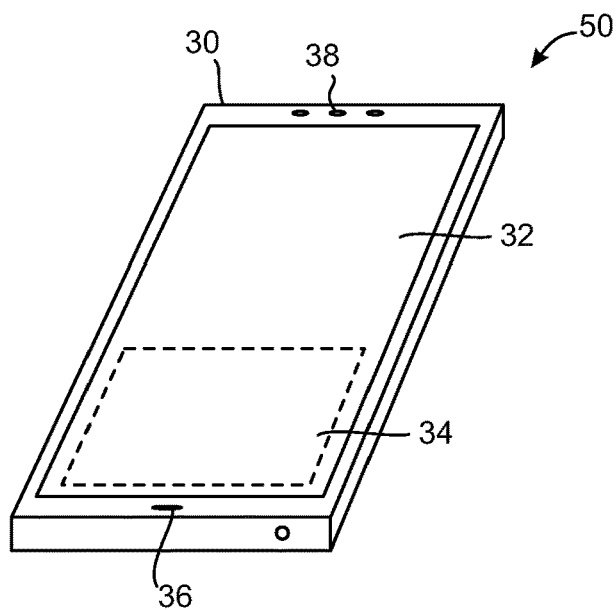
FIG. 2 shows schematically a user equipment suitable for employing embodiments of the invention.

The following describes in further detail suitable apparatus and possible mechanisms for neural-net based video/image encoding. In this regard reference is first made to FIGS. 1 and 2, where FIG. 1 shows a block diagram of a video coding system according to an example embodiment as a schematic block diagram of an exemplary apparatus or electronic device 50, which may incorporate a codec according to an embodiment of the invention. FIG. 2 shows a layout of an apparatus according to an example embodiment. The elements of FIGS. 1 and 2 will be explained next.

The electronic device 50 may for example be a mobile terminal or user equipment of a wireless communication system. However, it would be appreciated that embodiments of the invention may be implemented within any electronic device or apparatus which may require encoding and decoding or encoding or decoding video images.

The apparatus 50 may comprise a housing 30 for incorporating and protecting the device. The apparatus 50 further may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example the user interface may be implemented as a virtual keyboard or data entry system as part of a touch-sensitive display.

The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery (or in other embodiments of the invention the device may be powered by any suitable mobile energy device such as solar cell, fuel cell or clockwork generator). The apparatus may further comprise a camera capable of recording or capturing images and/or video. The apparatus 50 may further comprise an infrared port for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56, processor or processor circuitry for controlling the apparatus 50. The controller 56 may be connected to memory 58 which in embodiments of the invention may store both data in the form of image and audio data and/or may also store instructions for implementation on the controller 56. The controller 56 may further be connected to codec circuitry 54 suitable for carrying out coding and/or decoding of audio and/or video data or assisting in coding and decoding carried out by the controller.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

The apparatus 50 may comprise a camera capable of recording or detecting individual frames which are then passed to the codec 54 or the controller for processing. The apparatus may receive the video image data for processing from another device prior to transmission and/or storage. The apparatus 50 may also receive either wirelessly or by a wired connection the image for coding/decoding. The structural elements of apparatus 50 described above represent examples of means for performing a corresponding function. It is appreciated that even though some embodiments have been described using codec 54 as an example, a video coding apparatus according to embodiments may comprise either encoder(s) or decoder(s), or both of them.

Figure 3:
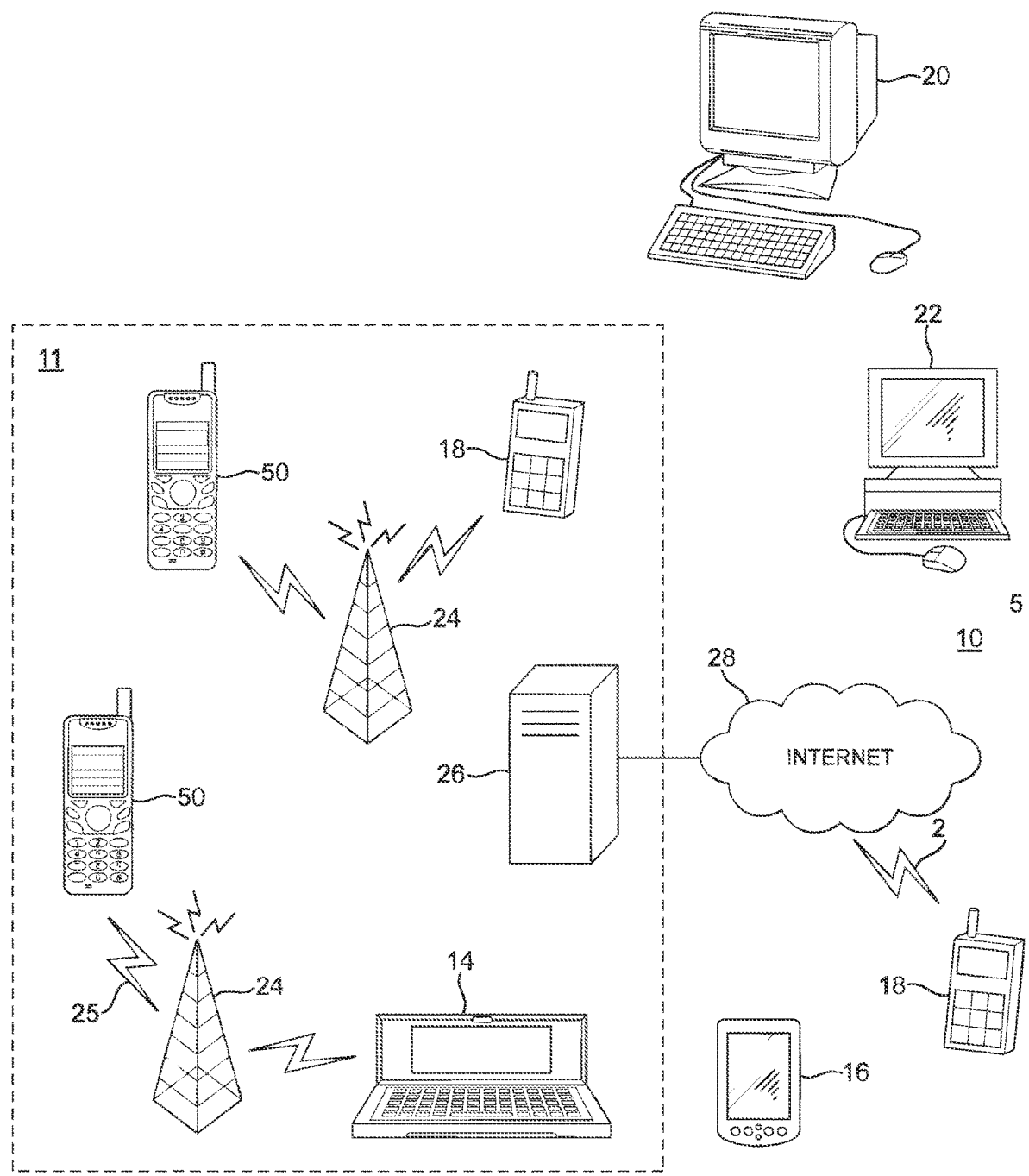
FIG. 3 further shows schematically electronic devices employing embodiments of the invention connected using wireless and wired network connections.

With respect to FIG. 3, an example of a system within which embodiments of the present invention can be utilized is shown. The system 10 comprises multiple communication devices which can communicate through one or more networks. The system 10 may comprise any one or a combination of wired or wireless networks including, but not limited to a wireless cellular telephone network (such as a GSM, UMTS, CDMA network etc.), a wireless local area network (WLAN) such as defined by any of the IEEE 802.x standards, a Bluetooth personal area network, an Ethernet local area network, a token ring local area network, a wide area network, a broadcast network, and the Internet.

The system 10 may include both wired and wireless communication devices and/or apparatus 50 suitable for implementing embodiments of the invention.

For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

The embodiments may also be implemented in a set-top box; i.e. a digital TV receiver, which may/may not have a display or wireless capabilities, in tablets or (laptop) personal computers (PC), which have hardware or software or combination of the encoder/decoder implementations, in various operating systems, and in chipsets, processors, DSPs and/or embedded systems offering hardware/software based coding.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-Internet protocol (TCP-IP), short messaging service (SMS), multimedia messaging service (MMS), email, instant messaging service (IMS), Bluetooth, IEEE 802.11 and any similar wireless communication technology. A communications device involved in implementing various embodiments of the present invention may communicate using various media including, but not limited to, radio, infrared, laser, cable connections, and any suitable connection.

In telecommunications and data networks, a channel may refer either to a physical channel or to a logical channel. A physical channel may refer to a physical transmission medium such as a wire, whereas a logical channel may refer to a logical connection over a multiplexed medium, capable of conveying several logical channels. A channel may be used for conveying an information signal, for example a bitstream, from one or several senders (or transmitters) to one or several receivers.

An MPEG-2 transport stream (TS), specified in ISO/IEC 13818-1 or equivalently in ITU-T Recommendation H.222.0, is a format for carrying audio, video, and other media as well as program metadata or other metadata, in a multiplexed stream. A packet identifier (PID) is used to identify an elementary stream (a.k.a. packetized elementary stream) within the TS. Hence, a logical channel within an MPEG-2 TS may be considered to correspond to a specific PID value.

Available media file format standards include ISO base media file format (ISO/IEC 14496-12, which may be abbreviated ISOBMFF) and file format for NAL unit structured video (ISO/IEC 14496-15), which derives from the ISOBMFF.

Video codec may comprise an encoder that transforms the input video into a compressed representation suited for storage/transmission and a decoder that can uncompress the compressed video representation back into a viewable form. A video encoder and/or a video decoder may also be separate from each other, i.e. need not form a codec. Typically encoder discards some information in the original video sequence in order to represent the video in a more compact form (that is, at lower bitrate).

Typical hybrid video encoders, for example many encoder implementations of ITU-T H.263 and H.264, encode the video information in two phases. Firstly pixel values in a certain picture area (or "block") are predicted for example by motion compensation means (finding and indicating an area in one of the previously coded video frames that corresponds closely to the block being coded) or by spatial means (using the pixel values around the block to be coded in a specified manner). Secondly the prediction error, i.e. the difference between the predicted block of pixels and the original block of pixels, is coded. This is typically done by transforming the difference in pixel values using a specified transform (e.g. Discrete Cosine Transform (DCT) or a variant of it), quantizing the coefficients and entropy coding the quantized coefficients. By varying the fidelity of the quantization process, encoder can control the balance between the accuracy of the pixel representation (picture quality) and size of the resulting coded video representation (file size or transmission bitrate).

In temporal prediction, the sources of prediction are previously decoded pictures (a.k.a. reference pictures). In intra block copy (IBC; a.k.a. intra-block-copy prediction), prediction is applied similarly to temporal prediction but the reference picture is the current picture and only previously decoded samples can be referred in the prediction process. Inter-layer or inter-view prediction may be applied similarly to temporal prediction, but the reference picture is a decoded picture from another scalable layer or from another view, respectively. In some cases, inter prediction may refer to temporal prediction only, while in other cases inter prediction may refer collectively to temporal prediction and any of intra block copy, inter-layer prediction, and inter-view prediction provided that they are performed with the same or similar process than temporal prediction. Inter prediction or temporal prediction may sometimes be referred to as motion compensation or motion-compensated prediction.

Inter prediction, which may also be referred to as temporal prediction, motion compensation, or motion-compensated prediction, reduces temporal redundancy. In inter prediction the sources of prediction are previously decoded pictures. Intra prediction utilizes the fact that adjacent pixels within the same picture are likely to be correlated. Intra prediction can be performed in spatial or transform domain, i.e., either sample values or transform coefficients can be predicted. Intra prediction is typically exploited in intra coding, where no inter prediction is applied.

One outcome of the coding procedure is a set of coding parameters, such as motion vectors and quantized transform coefficients. Many parameters can be entropy-coded more efficiently if they are predicted first from spatially or temporally neighboring parameters. For example, a motion vector may be predicted from spatially adjacent motion vectors and only the difference relative to the motion vector predictor may be coded. Prediction of coding parameters and intra prediction may be collectively referred to as in-picture prediction.

Figure 4:
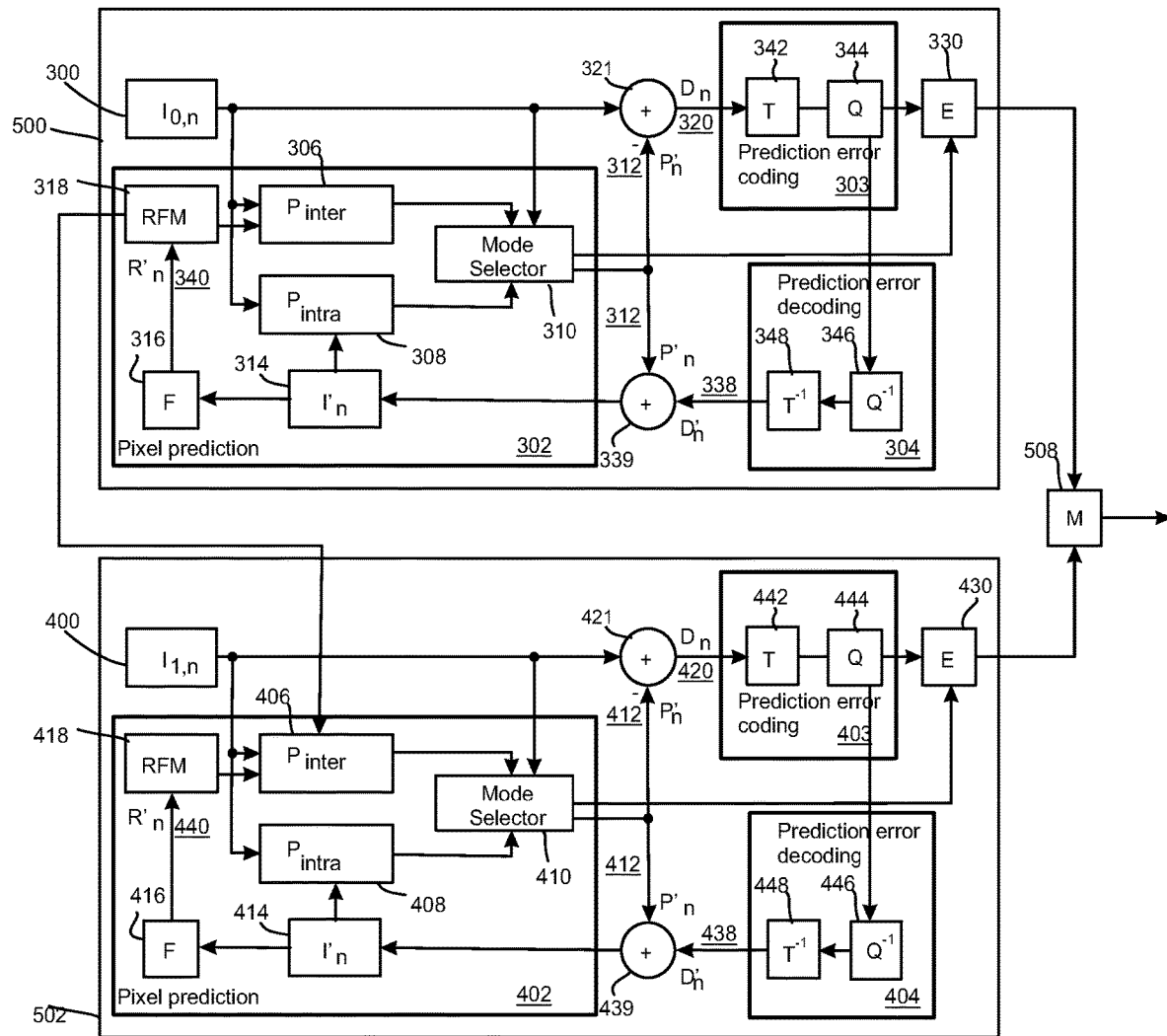
FIG. 4 shows schematically a block chart of an encoder on a general level.

FIG. 4 shows a block diagram of a general structure of a video encoder. FIG. 4 presents an encoder for two layers, but it would be appreciated that presented encoder could be similarly extended to encode more than two layers, or, to encode a single layer. FIG. 4 illustrates a video encoder comprising a first encoder section 500 for a base layer and a second encoder section 502 for an enhancement layer. Each of the first encoder section 500 and the second encoder section 502 may comprise similar elements for encoding incoming pictures. The encoder sections 500, 502 may comprise a pixel predictor 302, 402, prediction error encoder 303, 403 and prediction error decoder 304, 404. FIG. 4 also shows an embodiment of the pixel predictor 302, 402 as comprising an inter-predictor 306, 406, an intra-predictor 308, 408, a mode selector 310, 410, a filter 316, 416, and a reference frame memory 318, 418. The pixel predictor 302 of the first encoder section 500 receives 300 base layer images of a video stream to be encoded at both the inter-predictor 306 (which determines the difference between the image and a motion compensated reference frame 318) and the intra-predictor 308 (which determines a prediction for an image block based only on the already processed parts of current frame or picture). The output of both the inter-predictor and the intra-predictor are passed to the mode selector 310. The intra-predictor 308 may have more than one intra-prediction modes. Hence, each mode may perform the intra-prediction and provide the predicted signal to the mode selector 310. The mode selector 310 also receives a copy of the base layer picture 300. Correspondingly, the pixel predictor 402 of the second encoder section 502 receives 400 enhancement layer images of a video stream to be encoded at both the inter-predictor 406 (which determines the difference between the image and a motion compensated reference frame 418) and the intra-predictor 408 (which determines a prediction for an image block based only on the already processed parts of current frame or picture). The output of both the inter-predictor and the intra-predictor are passed to the mode selector 410. The intra-predictor 408 may have more than one intra-prediction modes. Hence, each mode may perform the intra-prediction and provide the predicted signal to the mode selector 410. The mode selector 410 also receives a copy of the enhancement layer picture 400.

Depending on which encoding mode is selected to encode the current block, the output of the inter-predictor 306, 406 or the output of one of the optional intra-predictor modes or the output of a surface encoder within the mode selector is passed to the output of the mode selector 310, 410. The output of the mode selector is passed to a first summing device 321, 421. The first summing device may subtract the output of the pixel predictor 302, 402 from the base layer picture 300/enhancement layer picture 400 to produce a first prediction error signal 320, 420 which is input to the prediction error encoder 303, 403.

The pixel predictor 302, 402 further receives from a preliminary reconstructor 339, 439 the combination of the prediction representation of the image block 312, 412 and the output 338, 438 of the prediction error decoder 304, 404. The preliminary reconstructed image 314, 414 may be passed to the intra-predictor 308, 408 and to a filter 316, 416. The filter 316, 416 receiving the preliminary representation may filter the preliminary representation and output a final reconstructed image 340, 440 which may be saved in a reference frame memory 318, 418. The reference frame memory 318 may be connected to the inter-predictor 306 to be used as the reference image against which a future base layer picture 300 is compared in inter-prediction operations. Subject to the base layer being selected and indicated to be source for inter-layer sample prediction and/or inter-layer motion information prediction of the enhancement layer according to some embodiments, the reference frame memory 318 may also be connected to the inter-predictor 406 to be used as the reference image against which a future enhancement layer pictures 400 is compared in inter-prediction operations. Moreover, the reference frame memory 418 may be connected to the inter-predictor 406 to be used as the reference image against which a future enhancement layer picture 400 is compared in inter-prediction operations.

Filtering parameters from the filter 316 of the first encoder section 500 may be provided to the second encoder section 502 subject to the base layer being selected and indicated to be source for predicting the filtering parameters of the enhancement layer according to some embodiments.

The prediction error encoder 303, 403 comprises a transform unit 342, 442 and a quantizer 344, 444. The transform unit 342, 442 transforms the first prediction error signal 320, 420 to a transform domain. The transform is, for example, the DCT transform. The quantizer 344, 444 quantizes the transform domain signal, e.g. the DCT coefficients, to form quantized coefficients.

The prediction error decoder 304, 404 receives the output from the prediction error encoder 303, 403 and performs the opposite processes of the prediction error encoder 303, 403 to produce a decoded prediction error signal 338, 438 which, when combined with the prediction representation of the image block 312, 412 at the second summing device 339, 439, produces the preliminary reconstructed image 314, 414. The prediction error decoder may be considered to comprise a dequantizer 361, 461, which dequantizes the quantized coefficient values, e.g. DCT coefficients, to reconstruct the transform signal and an inverse transformation unit 363, 463, which performs the inverse transformation to the reconstructed transform signal wherein the output of the inverse transformation unit 363, 463 contains reconstructed block(s). The prediction error decoder may also comprise a block filter which may filter the reconstructed block(s) according to further decoded information and filter parameters.

The entropy encoder 330, 430 receives the output of the prediction error encoder 303, 403 and may perform a suitable entropy encoding/variable length encoding on the signal to provide error detection and correction capability. The outputs of the entropy encoders 330, 430 may be inserted into a bitstream e.g. by a multiplexer 508.

Entropy coding/decoding may be performed in many ways. For example, context-based coding/decoding may be applied, where in both the encoder and the decoder modify the context state of a coding parameter based on previously coded/decoded coding parameters. Context-based coding may for example be context adaptive binary arithmetic coding (CABAC) or context-based variable length coding (CAVLC) or any similar entropy coding. Entropy coding/decoding may alternatively or additionally be performed using a variable length coding scheme, such as Huffman coding/decoding or Exp-Golomb coding/decoding. Decoding of coding parameters from an entropy-coded bitstream or codewords may be referred to as parsing.

The H.264/AVC standard was developed by the Joint Video Team (JVT) of the Video Coding Experts Group (VCEG) of the Telecommunications Standardization Sector of International Telecommunication Union (ITU-T) and the Moving Picture Experts Group (MPEG) of International Organisation for Standardization (ISO)/International Electrotechnical Commission (IEC). The H.264/AVC standard is published by both parent standardization organizations, and it is referred to as ITU-T Recommendation H.264 and ISO/IEC International Standard 14496-10, also known as MPEG-4 Part 10 Advanced Video Coding (AVC). There have been multiple versions of the H.264/AVC standard, integrating new extensions or features to the specification. These extensions include Scalable Video Coding (SVC) and Multiview Video Coding (MVC).

Version 1 of the High Efficiency Video Coding (H.265/HEVC a.k.a. HEVC) standard was developed by the Joint Collaborative Team-Video Coding (JCT-VC) of VCEG and MPEG. The standard was published by both parent standardization organizations, and it is referred to as ITU-T Recommendation H.265 and ISO/IEC International Standard 23008-2, also known as MPEG-H Part 2 High Efficiency Video Coding (HEVC). Later versions of H.265/HEVC included scalable, multiview, fidelity range extensions, three-dimensional, and screen content coding extensions which may be abbreviated SHVC, MV-HEVC, REXT, 3D-HEVC, and SCC, respectively.

SHVC, MV-HEVC, and 3D-HEVC use a common basis specification, specified in Annex F of the version 2 of the HEVC standard. This common basis comprises for example high-level syntax and semantics e.g. specifying some of the characteristics of the layers of the bitstream, such as inter-layer dependencies, as well as decoding processes, such as reference picture list construction including inter-layer reference pictures and picture order count derivation for multi-layer bitstream. Annex F may also be used in potential subsequent multi-layer extensions of HEVC. It is to be understood that even though a video encoder, a video decoder, encoding methods, decoding methods, bitstream structures, and/or embodiments may be described in the following with reference to specific extensions, such as SHVC and/or MV-HEVC, they are generally applicable to any multi-layer extensions of HEVC, and even more generally to any multi-layer video coding scheme.

Some key definitions, bitstream and coding structures, and concepts of H.264/AVC and HEVC are described in this section as an example of a video encoder, decoder, encoding method, decoding method, and a bitstream structure, wherein the embodiments may be implemented. Some of the key definitions, bitstream and coding structures, and concepts of H.264/AVC are the same as in HEVC—hence, they are described below jointly. The aspects of the invention are not limited to H.264/AVC or HEVC, but rather the description is given for one possible basis on top of which the invention may be partly or fully realized.

Similarly to many earlier video coding standards, the bitstream syntax and semantics as well as the decoding process for error-free bitstreams are specified in H.264/AVC and HEVC. The encoding process is not specified, but encoders must generate conforming bitstreams. Bitstream and decoder conformance can be verified with the Hypothetical Reference Decoder (HRD). The standards contain coding tools that help in coping with transmission errors and losses, but the use of the tools in encoding is optional and no decoding process has been specified for erroneous bitstreams.

The elementary unit for the input to an H.264/AVC or HEVC encoder and the output of an H.264/AVC or HEVC decoder, respectively, is a picture. A picture given as an input to an encoder may also be referred to as a source picture, and a picture decoded by a decoded may be referred to as a decoded picture.

The source and decoded pictures are each comprised of one or more sample arrays, such as one of the following sets of sample arrays:

Luma (Y) only (monochrome).
Luma and two chroma (YCbCr or YCgCo).
Green, Blue and Red (GBR, also known as RGB).
Arrays representing other unspecified monochrome or tri-stimulus color samplings (for example, YZX, also known as XYZ).

In the following, these arrays may be referred to as luma (or L or Y) and chroma, where the two chroma arrays may be referred to as Cb and Cr; regardless of the actual color representation method in use. The actual color representation method in use can be indicated e.g. in a coded bitstream e.g. using the Video Usability Information (VUI) syntax of H.264/AVC and/or HEVC. A component may be defined as an array or single sample from one of the three sample arrays (luma and two chroma) or the array or a single sample of the array that compose a picture in monochrome format.

In H.264/AVC and HEVC, a picture may either be a frame or a field. A frame comprises a matrix of luma samples and possibly the corresponding chroma samples. A field is a set of alternate sample rows of a frame and may be used as encoder input, when the source signal is interlaced. Chroma sample arrays may be absent (and hence monochrome sampling may be in use) or chroma sample arrays may be subsampled when compared to luma sample arrays. Chroma formats may be summarized as follows:

In monochrome sampling there is only one sample array, which may be nominally considered the luma array.

In 4:2:0 sampling, each of the two chroma arrays has half the height and half the width of the luma array.

In 4:2:2 sampling, each of the two chroma arrays has the same height and half the width of the luma array.

In 4:4:4 sampling when no separate color planes are in use, each of the two chroma arrays has the same height and width as the luma array.

In H.264/AVC and HEVC, it is possible to code sample arrays as separate color planes into the bitstream and respectively decode separately coded color planes from the bitstream. When separate color planes are in use, each one of them is separately processed (by the encoder and/or the decoder) as a picture with monochrome sampling.

A partitioning may be defined as a division of a set into subsets such that each element of the set is in exactly one of the subsets.

When describing the operation of HEVC encoding and/or decoding, the following terms may be used. A coding block may be defined as an N×N block of samples for some value of N such that the division of a coding tree block into coding blocks is a partitioning. A coding tree block (CTB) may be defined as an N×N block of samples for some value of N such that the division of a component into coding tree blocks is a partitioning. A coding tree unit (CTU) may be defined as a coding tree block of luma samples, two corresponding coding tree blocks of chroma samples of a picture that has three sample arrays, or a coding tree block of samples of a monochrome picture or a picture that is coded using three separate color planes and syntax structures used to code the samples. A coding unit (CU) may be defined as a coding block of luma samples, two corresponding coding blocks of chroma samples of a picture that has three sample arrays, or a coding block of samples of a monochrome picture or a picture that is coded using three separate color planes and syntax structures used to code the samples. A CU with the maximum allowed size may be named as LCU (largest coding unit) or coding tree unit (CTU) and the video picture is divided into non-overlapping LCUs.

A CU consists of one or more prediction units (PU) defining the prediction process for the samples within the CU and one or more transform units (TU) defining the prediction error coding process for the samples in the said CU. Typically, a CU comprises a square block of samples with a size selectable from a predefined set of possible CU sizes. Each PU and TU can be further split into smaller PUs and TUs in order to increase granularity of the prediction and prediction error coding processes, respectively. Each PU has prediction information associated with it defining what kind of a prediction is to be applied for the pixels within that PU (e.g. motion vector information for inter predicted PUs and intra prediction directionality information for intra predicted PUs).

Each TU can be associated with information describing the prediction error decoding process for the samples within the said TU (including e.g. DCT coefficient information). It is typically signalled at CU level whether prediction error coding is applied or not for each CU. In the case there is no prediction error residual associated with the CU, it can be considered there are no TUs for the said CU. The division of the image into CUs, and division of CUs into PUs and TUs is typically signalled in the bitstream allowing the decoder to reproduce the intended structure of these units.

In some coding systems, such as HEVC, a picture can be partitioned in tiles, which are rectangular and contain an integer number of blocks, such as LCUs in HEVC. In HEVC, the partitioning to tiles forms a regular grid that may be characterized by a list of tile column widths and a list of tile row heights. Tiles are ordered in the bitstream consecutively in the raster scan order of the tile grid. A tile may contain an integer number of slices, or a slice may contain an integer number of tiles. The blocks (such as CTUs in HEVC) may be scanned in encoding and decoding tile-wise in the raster scan order of blocks, and tiles may be scanned in raster scan order along the tile grid.

Video coding standards and specifications may allow encoders to divide a coded picture to coded slices or alike. In-picture prediction is typically disabled across slice boundaries. Thus, slices can be regarded as a way to split a coded picture to independently decodable pieces. Slices are therefore often regarded as elementary units for transmission. In many cases, encoders may indicate in the bitstream which types of in-picture prediction are turned off across slice boundaries, and the decoder operation takes this information into account for example when concluding which prediction sources are available. For example, samples from a neighbouring block may be regarded as unavailable for intra prediction, if the neighbouring block resides in a different slice.

In HEVC, a slice is defined to be an integer number of coding tree units contained in one independent slice segment and all subsequent dependent slice segments (if any) that precede the next independent slice segment (if any) within the same access unit. In HEVC, a slice segment is defined to be an integer number of coding tree units ordered consecutively in the tile scan and contained in a single NAL unit. The division of each picture into slice segments is a partitioning. In HEVC, an independent slice segment is defined to be a slice segment for which the values of the syntax elements of the slice segment header are not inferred from the values for a preceding slice segment, and a dependent slice segment is defined to be a slice segment for which the values of some syntax elements of the slice segment header are inferred from the values for the preceding independent slice segment in decoding order. In HEVC, a slice header is defined to be the slice segment header of the independent slice segment that is a current slice segment or is the independent slice segment that precedes a current dependent slice segment, and a slice segment header is defined to be a part of a coded slice segment containing the data elements pertaining to the first or all coding tree units represented in the slice segment. The CUs are scanned in the raster scan order of LCUs within tiles or within a picture, if tiles are not in use. Within an LCU, the CUs have a specific scan order.

In wavefront parallel processing (WPP) each block row (such as CTU row in HEVC) of a slice can be encoded and decoded in parallel. When WPP is used, the state of the entropy codec at the beginning of a block row is obtained from the state of the entropy codec of the block row above after processing the second block of that row. Consequently, block rows can be processed in parallel with a delay of 2 blocks per each block row.

A motion-constrained tile set (MCTS) is such that the inter prediction process is constrained in encoding such that no sample value outside the motion-constrained tile set, and no sample value at a fractional sample position that is derived using one or more sample values outside the motion-constrained tile set, is used for inter prediction of any sample within the motion-constrained tile set. Additionally, the encoding of an MCTS is constrained in a manner that motion vector candidates are not derived from blocks outside the MCTS. This may be enforced by turning off temporal motion vector prediction of HEVC, or by disallowing the encoder to use the TMVP candidate or any motion vector prediction candidate following the TMVP candidate in the merge or AMVP candidate list for PUs located directly left of the right tile boundary of the MCTS except the last one at the bottom right of the MCTS. In general, an MCTS may be defined to be a tile set that is independent of any sample values and coded data, such as motion vectors, that are outside the MCTS. In some cases, an MCTS may be required to form a rectangular area. It should be understood that depending on the context, an MCTS may refer to the tile set within a picture or to the respective tile set in a sequence of pictures. The respective tile set may be, but in general need not be, collocated in the sequence of pictures.

It is noted that slices, wavefronts and tiles, also when included in MCTSs, may be used as parallelization tools to enable running several encoding and/or decoding threads or processes in parallel.

It is noted that sample locations used in inter prediction may be saturated by the encoding and/or decoding process so that a location that would be outside the picture otherwise is saturated to point to the corresponding boundary sample of the picture. Hence, if a tile boundary is also a picture boundary, in some use cases, encoders may allow motion vectors to effectively cross that boundary or a motion vector to effectively cause fractional sample interpolation that would refer to a location outside that boundary, since the sample locations are saturated onto the boundary. In other use cases, specifically if a coded tile may be extracted from a bitstream where it is located on a position adjacent to a picture boundary to another bitstream where the tile is located on a position that is not adjacent to a picture boundary, encoders may constrain the motion vectors on picture boundaries similarly to any MCTS boundaries.

The temporal motion-constrained tile sets SEI message of HEVC can be used to indicate the presence of motion-constrained tile sets in the bitstream.

The decoder reconstructs the output video by applying prediction means similar to the encoder to form a predicted representation of the pixel blocks (using the motion or spatial information created by the encoder and stored in the compressed representation) and prediction error decoding (inverse operation of the prediction error coding recovering the quantized prediction error signal in spatial pixel domain). After applying prediction and prediction error decoding means the decoder sums up the prediction and prediction error signals (pixel values) to form the output video frame. The decoder (and encoder) can also apply additional filtering means to improve the quality of the output video before passing it for display and/or storing it as prediction reference for the forthcoming frames in the video sequence.

The filtering may for example include one more of the following: deblocking, sample adaptive offset (SAO), and/or adaptive loop filtering (ALF). H.264/AVC includes a deblocking, whereas HEVC includes both deblocking and SAO.

The deblocking loop filter may include multiple filtering modes or strengths, which may be adaptively selected based on the features of the blocks adjacent to the boundary, such as the quantization parameter value, and/or signaling included by the encoder in the bitstream. For example, the deblocking loop filter may comprise a normal filtering mode and a strong filtering mode, which may differ in terms of the number of filter taps (i.e. number of samples being filtered on both sides of the boundary) and/or the filter tap values. For example, filtering of two samples along both sides of the boundary may be performed with a filter having the impulse response of (3 7 9 −3)/16, when omitting the potential impact of a clipping operation.

An example of SAO is given next with reference to HEVC; however, SAO can be similarly applied to other coding schemes too. In SAO, a picture is divided into regions where a separate SAO decision is made for each region. In HEVC, the basic unit for adapting SAO parameters is CTU (therefore an SAO region is the block covered by the corresponding CTU).

In the SAO algorithm, samples in a CTU are classified according to a set of rules and each classified set of samples are enhanced by adding offset values. The offset values are signalled in the bitstream. There are two types of offsets: 1) Band offset 2) Edge offset. For a CTU, either no SAO or band offset or edge offset is employed. Choice of whether no SAO or band or edge offset to be used may be decided by the encoder with e.g. rate distortion optimization (RDO) and signaled to the decoder.

In the band offset, the whole range of sample values is in some embodiments divided into 32 equal-width bands. For example, for 8-bit samples, width of a band is 8 (=256/32). Out of 32 bands, 4 of them are selected and different offsets are signalled for each of the selected bands. The selection decision is made by the encoder and may be signalled as follows: The index of the first band is signalled and then it is inferred that the following four bands are the chosen ones. The band offset may be useful in correcting errors in smooth regions.

In the edge offset type, the edge offset (EO) type may be chosen out of four possible types (or edge classifications) where each type is associated with a direction: 1) vertical, 2) horizontal, 3) 135 degrees diagonal, and 4) 45 degrees diagonal. The choice of the direction is given by the encoder and signalled to the decoder. Each type defines the location of two neighbour samples for a given sample based on the angle. Then each sample in the CTU is classified into one of five categories based on comparison of the sample value against the values of the two neighbour samples. After each sample in an edge offset type CTU is classified as one of the five categories, an offset value for each of the first four categories is determined and signalled to the decoder. The offset for each category is added to the sample values associated with the corresponding category. Edge offsets may be effective in correcting ringing artifacts.

The adaptive loop filter (ALF) is another method to enhance quality of the reconstructed samples. This may be achieved by filtering the sample values in the loop. In some embodiments the encoder determines which region of the pictures are to be filtered and the filter coefficients based on e.g. RDO and this information is signalled to the decoder.

In typical video codecs the motion information is indicated with motion vectors associated with each motion compensated image block, such as a prediction unit. Each of these motion vectors represents the displacement of the image block in the picture to be coded (in the encoder side) or decoded (in the decoder side) and the prediction source block in one of the previously coded or decoded pictures. In order to represent motion vectors efficiently those are typically coded differentially with respect to block specific predicted motion vectors. In typical video codecs the predicted motion vectors are created in a predefined way, for example calculating the median of the encoded or decoded motion vectors of the adjacent blocks. Another way to create motion vector predictions is to generate a list of candidate predictions from adjacent blocks and/or co-located blocks in temporal reference pictures and signalling the chosen candidate as the motion vector predictor. In addition to predicting the motion vector values, it can be predicted which reference picture(s) are used for motion-compensated prediction and this prediction information may be represented for example by a reference index of previously coded/decoded picture. The reference index is typically predicted from adjacent blocks and/or co-located blocks in temporal reference picture. Moreover, typical high efficiency video codecs employ an additional motion information coding/decoding mechanism, often called merging/merge mode, where all the motion field information, which includes motion vector and corresponding reference picture index for each available reference picture list, is predicted and used without any modification/correction. Similarly, predicting the motion field information is carried out using the motion field information of adjacent blocks and/or co-located blocks in temporal reference pictures and the used motion field information is signalled among a list of motion field candidate list filled with motion field information of available adjacent/co-located blocks.

In typical video codecs the prediction residual after motion compensation is first transformed with a transform kernel (like DCT) and then coded. The reason for this is that often there still exists some correlation among the residual and transform can in many cases help reduce this correlation and provide more efficient coding.

Typical video encoders utilize Lagrangian cost functions to find optimal coding modes, e.g. the desired coding mode for a block and associated motion vectors. This kind of cost function uses a weighting factor λ to tie together the (exact or estimated) image distortion due to lossy coding methods and the (exact or estimated) amount of information that is required to represent the pixel values in an image area:

$$C=D+\lambda R, \quad (1)$$

where C is the Lagrangian cost to be minimized, D is the image distortion (e.g. Mean Squared Error) with the mode and motion vectors considered, and R the number of bits needed to represent the required data to reconstruct the image block in the decoder (including the amount of data to represent the candidate motion vectors).

Video coding standards and specifications may allow encoders to divide a coded picture to coded slices or alike. In-picture prediction is typically disabled across slice boundaries. Thus, slices can be regarded as a way to split a coded picture to independently decodable pieces. In H.264/AVC and HEVC, in-picture prediction may be disabled across slice boundaries. Thus, slices can be regarded as a way to split a coded picture into independently decodable pieces, and slices are therefore often regarded as elementary units for transmission. In many cases, encoders may indicate in the bitstream which types of in-picture prediction are turned off across slice boundaries, and the decoder operation takes this information into account for example when concluding which prediction sources are available. For example, samples from a neighboring CU may be regarded as unavailable for intra prediction, if the neighboring CU resides in a different slice.

An elementary unit for the output of an H.264/AVC or HEVC encoder and the input of an H.264/AVC or HEVC decoder, respectively, is a Network Abstraction Layer (NAL) unit. For transport over packet-oriented networks or storage into structured files, NAL units may be encapsulated into packets or similar structures. A bytestream format has been specified in H.264/AVC and HEVC for transmission or storage environments that do not provide framing structures. The bytestream format separates NAL units from each other by attaching a start code in front of each NAL unit. To avoid false detection of NAL unit boundaries, encoders run a byte-oriented start code emulation prevention algorithm, which adds an emulation prevention byte to the NAL unit payload if a start code would have occurred otherwise. In order to enable straightforward gateway operation between packet- and stream-oriented systems, start code emulation prevention may always be performed regardless of whether the bytestream format is in use or not. A NAL unit may be defined as a syntax structure containing an indication of the type of data to follow and bytes containing that data in the form of an RBSP interspersed as necessary with emulation prevention bytes. A raw byte sequence payload (RBSP) may be defined as a syntax structure containing an integer number of bytes that is encapsulated in a NAL unit. An RBSP is either empty or has the form of a string of data bits containing syntax elements followed by an RBSP stop bit and followed by zero or more subsequent bits equal to 0.

NAL units consist of a header and payload. In H.264/AVC and HEVC, the NAL unit header indicates the type of the NAL unit In HEVC, a two-byte NAL unit header is used for all specified NAL unit types. The NAL unit header contains one reserved bit, a six-bit NAL unit type indication, a three-bit nuh_temporal_id_plus1 indication for temporal level (may be required to be greater than or equal to 1) and a six-bit nuh_layer_id syntax element. The temporal_id_plus1 syntax element may be regarded as a temporal identifier for the NAL unit, and a zero-based TemporalId variable may be derived as follows: TemporalId=temporal_id_plus1−1. The abbreviation TID may be used to interchangeably with the TemporalId variable. TemporalId equal to 0 corresponds to the lowest temporal level. The value of temporal_id_plus1 is required to be non-zero in order to avoid start code emulation involving the two NAL unit header bytes. The bitstream created by excluding all VCL NAL units having a TemporalId greater than or equal to a selected value and including all other VCL NAL units remains conforming. Consequently, a picture having TemporalId equal to tid_value does not use any picture having a TemporalId greater than tid_value as inter prediction reference. A sub-layer or a temporal sub-layer may be defined to be a temporal scalable layer (or a temporal layer, TL) of a temporal scalable bitstream, consisting of VCL NAL units with a particular value of the TemporalId variable and the associated non-VCL NAL units. A picture at temporal sub-layer with TemporalId equal to N may be predicted from reference pictures at temporal sub-layers with TemporalId less than or equal to N (unless further constrained by the picture type as explained below) and is disallowed or disabled to be predicted from reference pictures at temporal sub-layers with TemporalId greater than N. nuh_layer_id can be understood as a scalability layer identifier.

NAL units can be categorized into Video Coding Layer (VCL) NAL units and non-VCL NAL units. VCL NAL units are typically coded slice NAL units. In HEVC, VCL NAL units contain syntax elements representing one or more CU.

In HEVC, abbreviations for picture types may be defined as follows: trailing (TRAIL) picture, Temporal Sub-layer Access (TSA), Step-wise Temporal Sub-layer Access (STSA), Random Access Decodable Leading (RADL) picture, Random Access Skipped Leading (RASL) picture, Broken Link Access (BLA) picture, Instantaneous Decoding Refresh (IDR) picture, Clean Random Access (CRA) picture.

A Random Access Point (RAP) picture, which may also be referred to as an intra random access point (IRAP) picture in an independent layer contains only intra-coded slices. An IRAP picture belonging to a predicted layer may contain P, B, and I slices, cannot use inter prediction from other picturesin the same predicted layer, and may use inter-layer prediction from its direct reference layers. In the present version of HEVC, an IRAP picture may be a BLA picture, a CRA picture or an IDR picture. The first picture in a bitstream containing a base layer is an IRAP picture at the base layer. Provided the necessary parameter sets are available when they need to be activated, an IRAP picture at an independent layer and all subsequent non-RASL pictures at the independent layer in decoding order can be correctly decoded without performing the decoding process of any pictures that precede the IRAP picture in decoding order. The IRAP picture belonging to a predicted layer and all subsequent non-RASL pictures in decoding order within the same predicted layer can be correctly decoded without performing the decoding process of any pictures of the same predicted layer that precede the IRAP picture in decoding order, when the necessary parameter sets are available when they need to be activated and when the decoding of each direct reference layer of the predicted layer has been initialized. There may be pictures in a bitstream that contain only intra-coded slices that are not IRAP pictures.

In HEVC there are two picture types, the TSA and STSA picture types that can be used to indicate temporal sub-layer switching points. If temporal sub-layers with TemporalId up to N had been decoded until the TSA or STSA picture (exclusive) and the TSA or STSA picture has TemporalId equal to N+1, the TSA or STSA picture enables decoding of all subsequent pictures (in decoding order) having TemporalId equal to N+1. The TSA picture type may impose restrictions on the TSA picture itself and all pictures in the same sub-layer that follow the TSA picture in decoding order. None of these pictures is allowed to use inter prediction from any picture in the same sub-layer that precedes the TSA picture in decoding order. The TSA definition may further impose restrictions on the pictures in higher sub-layers that follow the TSA picture in decoding order. None of these pictures is allowed to refer a picture that precedes the TSA picture in decoding order if that picture belongs to the same or higher sub-layer as the TSA picture. TSA pictures have TemporalId greater than 0. The STSA is similar to the TSA picture but does not impose restrictions on the pictures in higher sub-layers that follow the STSA picture in decoding order and hence enable up-switching only onto the sub-layer where the STSA picture resides.

A non-VCL NAL unit may be for example one of the following types: a sequence parameter set, a picture parameter set, a supplemental enhancement information (SEI) NAL unit, an access unit delimiter, an end of sequence NAL unit, an end of bitstream NAL unit, or a filler data NAL unit. Parameter sets may be needed for the reconstruction of decoded pictures, whereas many of the other non-VCL NAL units are not necessary for the reconstruction of decoded sample values.

Parameters that remain unchanged through a coded video sequence may be included in a sequence parameter set. In addition to the parameters that may be needed by the decoding process, the sequence parameter set may optionally contain video usability information (VUI), which includes parameters that may be important for buffering, picture output timing, rendering, and resource reservation. In HEVC a sequence parameter set RBSP includes parameters that can be referred to by one or more picture parameter set RBSPs or one or more SEI NAL units containing a buffering period SEI message. A picture parameter set contains such parameters that are likely to be unchanged in several coded pictures. A picture parameter set RBSP may include parameters that can be referred to by the coded slice NAL units of one or more coded pictures.

In HEVC, a video parameter set (VPS) may be defined as a syntax structure containing syntax elements that apply to zero or more entire coded video sequences as determined by the content of a syntax element found in the SPS referred to by a syntax element found in the PPS referred to by a syntax element found in each slice segment header.

A video parameter set RBSP may include parameters that can be referred to by one or more sequence parameter set RBSPs.

The relationship and hierarchy between video parameter set (VPS), sequence parameter set (SPS), and picture parameter set (PPS) may be described as follows. VPS resides one level above SPS in the parameter set hierarchy and in the context of scalability and/or 3D video. VPS may include parameters that are common for all slices across all (scalability or view) layers in the entire coded video sequence. SPS includes the parameters that are common for all slices in a particular (scalability or view) layer in the entire coded video sequence, and may be shared by multiple (scalability or view) layers. PPS includes the parameters that are common for all slices in a particular layer representation (the representation of one scalability or view layer in one access unit) and are likely to be shared by all slices in multiple layer representations.

VPS may provide information about the dependency relationships of the layers in a bitstream, as well as many other information that are applicable to all slices across all (scalability or view) layers in the entire coded video sequence. VPS may be considered to comprise two parts, the base VPS and a VPS extension, where the VPS extension may be optionally present.

Out-of-band transmission, signaling or storage can additionally or alternatively be used for other purposes than tolerance against transmission errors, such as ease of access or session negotiation. For example, a sample entry of a track in a file conforming to the ISO Base Media File Format may comprise parameter sets, while the coded data in the bitstream is stored elsewhere in the file or in another file. The phrase along the bitstream (e.g. indicating along the bitstream) or along a coded unit of a bitstream (e.g. indicating along a coded tile) may be used in claims and described embodiments to refer to out-of-band transmission, signaling, or storage in a manner that the out-of-band data is associated with the bitstream or the coded unit, respectively. The phrase decoding along the bitstream or along a coded unit of a bitstream or alike may refer to decoding the referred out-of-band data (which may be obtained from out-of-band transmission, signaling, or storage) that is associated with the bitstream or the coded unit, respectively. For example, the phrase along the bitstream may be used when the bitstream is contained in a file, such as a file conforming to the ISO Base Media File Format, and certain file metadata is stored in the file in a manner that associates the metadata to the bitstream, such as boxes in the sample entry for a track containing the bitstream, a sample group for the track containing the bitstream, or a timed metadata track associated with the track containing the bitstream.

A SEI NAL unit may contain one or more SEI messages, which are not required for the decoding of output pictures but may assist in related processes, such as picture output timing, rendering, error detection, error concealment, and resource reservation. Several SEI messages are specified in H.264/AVC and HEVC, and the user data SEI messages enable organizations and companies to specify SEI messages for their own use. H.264/AVC and HEVC contain the syntax and semantics for the specified SEI messages but no process for handling the messages in the recipient is defined. Consequently, encoders are required to follow the H.264/AVC standard or the HEVC standard when they create SEI messages, and decoders conforming to the H.264/AVC standard or the HEVC standard, respectively, are not required to process SEI messages for output order conformance. One of the reasons to include the syntax and semantics of SEI messages in H.264/AVC and HEVC is to allow different system specifications to interpret the supplemental information identically and hence interoperate. It is intended that system specifications can require the use of particular SEI messages both in the encoding end and in the decoding end, and additionally the process for handling particular SEI messages in the recipient can be specified.

In HEVC, there are two types of SEI NAL units, namely the suffix SEI NAL unit and the prefix SEI NAL unit, having a different nal_unit_type value from each other. The SEI message(s) contained in a suffix SEI NAL unit are associated with the VCL NAL unit preceding, in decoding order, the suffix SEI NAL unit. The SEI message(s) contained in a prefix SEI NAL unit are associated with the VCL NAL unit following, in decoding order, the prefix SEI NAL unit.

A coded picture is a coded representation of a picture.

In HEVC, a coded picture may be defined as a coded representation of a picture containing all coding tree units of the picture. In HEVC, an access unit (AU) may be defined as a set of NAL units that are associated with each other according to a specified classification rule, are consecutive in decoding order, and contain at most one picture with any specific value of nuh_layer_id. In addition to containing the VCL NAL units of the coded picture, an access unit may also contain non-VCL NAL units. Said specified classification rule may for example associate pictures with the same output time or picture output count value into the same access unit.

A bitstream may be defined as a sequence of bits, in the form of a NAL unit stream or a byte stream, that forms the representation of coded pictures and associated data forming one or more coded video sequences. A first bitstream may be followed by a second bitstream in the same logical channel, such as in the same file or in the same connection of a communication protocol. An elementary stream (in the context of video coding) may be defined as a sequence of one or more bitstreams. The end of the first bitstream may be indicated by a specific NAL unit, which may be referred to as the end of bitstream (EOB) NAL unit and which is the last NAL unit of the bitstream. In HEVC and its current draft extensions, the EOB NAL unit is required to have nuh_layer_id equal to 0.

In H.264/AVC, a coded video sequence is defined to be a sequence of consecutive access units in decoding order from an IDR access unit, inclusive, to the next IDR access unit, exclusive, or to the end of the bitstream, whichever appears earlier.

In HEVC, a coded video sequence (CVS) may be defined, for example, as a sequence of access units that consists, in decoding order, of an IRAP access unit with NoRaslOutputFlag equal to 1, followed by zero or more access units that are not IRAP access units with NoRaslOutputFlag equal to 1, including all subsequent access units up to but not including any subsequent access unit that is an IRAP access unit with NoRaslOutputFlag equal to 1. An IRAP access unit may be defined as an access unit in which the base layer picture is an IRAP picture. The value of NoRaslOutputFlag is equal to 1 for each IDR picture, each BLA picture, and each IRAP picture that is the first picture in that particular layer in the bitstream in decoding order, is the first IRAP picture that follows an end of sequence NAL unit having the same value of nuh_layer_id in decoding order. There may be means to provide the value of HandleCraAsBlaFlag to the decoder from an external entity, such as a player or a receiver, which may control the decoder. HandleCraAsBlaFlag may be set to 1 for example by a player that seeks to a new position in a bitstream or tunes into a broadcast and starts decoding and then starts decoding from a CRA picture. When HandleCraAsBlaFlag is equal to 1 for a CRA picture, the CRA picture is handled and decoded as if it were a BLA picture.

In HEVC, a coded video sequence may additionally or alternatively (to the specification above) be specified to end, when a specific NAL unit, which may be referred to as an end of sequence (EOS) NAL unit, appears in the bitstream and has nuh_layer_id equal to 0.

A group of pictures (GOP) and its characteristics may be defined as follows. A GOP can be decoded regardless of whether any previous pictures were decoded. An open GOP is such a group of pictures in which pictures preceding the initial intra picture in output order might not be correctly decodable when the decoding starts from the initial intra picture of the open GOP. In other words, pictures of an open GOP may refer (in inter prediction) to pictures belonging to a previous GOP. An HEVC decoder can recognize an intra picture starting an open GOP, because a specific NAL unit type, CRA NAL unit type, may be used for its coded slices. A closed GOP is such a group of pictures in which all pictures can be correctly decoded when the decoding starts from the initial intra picture of the closed GOP. In other words, no picture in a closed GOP refers to any pictures in previous GOPs. In H.264/AVC and HEVC, a closed GOP may start from an IDR picture. In HEVC a closed GOP may also start from a BLA_W_RADL or a BLA_N_LP picture. An open GOP coding structure is potentially more efficient in the compression compared to a closed GOP coding structure, due to a larger flexibility in selection of reference pictures.

A Decoded Picture Buffer (DPB) may be used in the encoder and/or in the decoder. There are two reasons to buffer decoded pictures, for references in inter prediction and for reordering decoded pictures into output order. As H.264/AVC and HEVC provide a great deal of flexibility for both reference picture marking and output reordering, separate buffers for reference picture buffering and output picture buffering may waste memory resources. Hence, the DPB may include a unified decoded picture buffering process for reference pictures and output reordering. A decoded picture may be removed from the DPB when it is no longer used as a reference and is not needed for output.

In many coding modes of H.264/AVC and HEVC, the reference picture for inter prediction is indicated with an index to a reference picture list. The index may be coded with variable length coding, which usually causes a smaller index to have a shorter value for the corresponding syntax element. In H.264/AVC and HEVC, two reference picture lists (reference picture list 0 and reference picture list 1) are generated for each bi-predictive (B) slice, and one reference picture list (reference picture list 0) is formed for each inter-coded (P) slice.

Many coding standards, including H.264/AVC and HEVC, may have decoding process to derive a reference picture index to a reference picture list, which may be used to indicate which one of the multiple reference pictures is used for inter prediction for a particular block. A reference picture index may be coded by an encoder into the bitstream is some inter coding modes or it may be derived (by an encoder and a decoder) for example using neighboring blocks in some other inter coding modes.

Several candidate motion vectors may be derived for a single prediction unit. For example, motion vector prediction HEVC includes two motion vector prediction schemes, namely the advanced motion vector prediction (AMVP) and the merge mode. In the AMVP or the merge mode, a list of motion vector candidates is derived for a PU. There are two kinds of candidates: spatial candidates and temporal candidates, where temporal candidates may also be referred to as TMVP candidates.

A candidate list derivation may be performed for example as follows, while it should be understood that other possibilities may exist for candidate list derivation. If the occupancy of the candidate list is not at maximum, the spatial candidates are included in the candidate list first if they are available and not already exist in the candidate list. After that, if occupancy of the candidate list is not yet at maximum, a temporal candidate is included in the candidate list. If the number of candidates still does not reach the maximum allowed number, the combined bi-predictive candidates (for B slices) and a zero motion vector are added in. After the candidate list has been constructed, the encoder decides the final motion information from candidates for example based on a rate-distortion optimization (RDO) decision and encodes the index of the selected candidate into the bitstream. Likewise, the decoder decodes the index of the selected candidate from the bitstream, constructs the candidate list, and uses the decoded index to select a motion vector predictor from the candidate list.

In HEVC, AMVP and the merge mode may be characterized as follows. In AMVP, the encoder indicates whether uni-prediction or bi-prediction is used and which reference pictures are used as well as encodes a motion vector difference. In the merge mode, only the chosen candidate from the candidate list is encoded into the bitstream indicating the current prediction unit has the same motion information as that of the indicated predictor. Thus, the merge mode creates regions composed of neighbouring prediction blocks sharing identical motion information, which is only signalled once for each region.

An example of the operation of advanced motion vector prediction is provided in the following, while other similar realizations of advanced motion vector prediction are also possible for example with different candidate position sets and candidate locations with candidate position sets. It also needs to be understood that other prediction mode, such as the merge mode, may operate similarly. Two spatial motion vector predictors (MVPs) may be derived and a temporal motion vector predictor (TMVP) may be derived. They may be selected among the positions: three spatial motion vector predictor candidate positions located above the current prediction block ($B_0$, $B_1$, $B_2$) and two on the left ($A_0$, $A_1$). The first motion vector predictor that is available (e.g. resides in the same slice, is inter-coded, etc.) in a pre-defined order of each candidate position set, ($B_0$, $B_1$, $B_2$) or ($A_0$, $A_1$), may be selected to represent that prediction direction (up or left) in the motion vector competition. A reference index for the temporal motion vector predictor may be indicated by the encoder in the slice header (e.g. as a collocated_ref_idx syntax element). The first motion vector predictor that is available (e.g. is inter-coded) in a pre-defined order of potential temporal candidate locations, e.g. in the order ($C_0$, $C_1$) may be selected as a source for a temporal motion vector predictor. The motion vector obtained from the first available candidate location in the co-located picture may be scaled according to the proportions of the picture order count differences of the reference picture of the temporal motion vector predictor, the co-located picture, and the current picture. Moreover, a redundancy check may be performed among the candidates to remove identical candidates, which can lead to the inclusion of a zero motion vector in the candidate list. The motion vector predictor may be indicated in the bitstream for example by indicating the direction of the spatial motion vector predictor (up or left) or the selection of the temporal motion vector predictor candidate. The co-located picture may also be referred to as the collocated picture, the source for motion vector prediction, or the source picture for motion vector prediction.

Motion parameter types or motion information may include but are not limited to one or more of the following types:
- an indication of a prediction type (e.g. intra prediction, uni-prediction, bi-prediction) and/or a number of reference pictures;
- an indication of a prediction direction, such as inter (a.k.a. temporal) prediction, inter-layer prediction, inter-view prediction, view synthesis prediction (VSP), and inter-component prediction (which may be indicated per reference picture and/or per prediction type and where in some embodiments inter-view and view-synthesis prediction may be jointly considered as one prediction direction) and/or
- an indication of a reference picture type, such as a short-term reference picture and/or a long-term reference picture and/or an inter-layer reference picture (which may be indicated e.g. per reference picture)
- a reference index to a reference picture list and/or any other identifier of a reference picture (which may be indicated e.g. per reference picture and the type of which may depend on the prediction direction and/or the reference picture type and which may be accompanied by other relevant pieces of information, such as the reference picture list or alike to which reference index applies);
- a horizontal motion vector component (which may be indicated e.g. per prediction block or per reference index or alike);
- a vertical motion vector component (which may be indicated e.g. per prediction block or per reference index or alike);
- one or more parameters, such as picture order count difference and/or a relative camera separation between the picture containing or associated with the motion parameters and its reference picture, which may be used for scaling of the horizontal motion vector component and/or the vertical motion vector component in one or more motion vector prediction processes (where said one or more parameters may be indicated e.g. per each reference picture or each reference index or alike);
coordinates of a block to which the motion parameters and/or motion information applies, e.g. coordinates of the top-left sample of the block in luma sample units;
extents (e.g. a width and a height) of a block to which the motion parameters and/or motion information applies.

In general, motion vector prediction mechanisms, such as those motion vector prediction mechanisms presented above as examples, may include prediction or inheritance of certain pre-defined or indicated motion parameters.

A motion field associated with a picture may be considered to comprise of a set of motion information produced for every coded block of the picture. A motion field may be accessible by coordinates of a block, for example. A motion field may be used for example in TMVP or any other motion prediction mechanism where a source or a reference for prediction other than the current (de)coded picture is used.

Different spatial granularity or units may be applied to represent and/or store a motion field. For example, a regular grid of spatial units may be used. For example, a picture may be divided into rectangular blocks of certain size (with the possible exception of blocks at the edges of the picture, such as on the right edge and the bottom edge). For example, the size of the spatial unit may be equal to the smallest size for which a distinct motion can be indicated by the encoder in the bitstream, such as a 4×4 block in luma sample units. For example, a so-called compressed motion field may be used, where the spatial unit may be equal to a pre-defined or indicated size, such as a 16×16 block in luma sample units, which size may be greater than the smallest size for indicating distinct motion. For example, an HEVC encoder and/or decoder may be implemented in a manner that a motion data storage reduction (MDSR) or motion field compression is performed for each decoded motion field (prior to using the motion field for any prediction between pictures). In an HEVC implementation, MDSR may reduce the granularity of motion data to 16×16 blocks in luma sample units by keeping the motion applicable to the top-left sample of the 16×16 block in the compressed motion field. The encoder may encode indication(s) related to the spatial unit of the compressed motion field as one or more syntax elements and/or syntax element values for example in a sequence-level syntax structure, such as a video parameter set or a sequence parameter set. In some (de)coding methods and/or devices, a motion field may be represented and/or stored according to the block partitioning of the motion prediction (e.g. according to prediction units of the HEVC standard). In some (de)coding methods and/or devices, a combination of a regular grid and block partitioning may be applied so that motion associated with partitions greater than a pre-defined or indicated spatial unit size is represented and/or stored associated with those partitions, whereas motion associated with partitions smaller than or unaligned with a pre-defined or indicated spatial unit size or grid is represented and/or stored for the pre-defined or indicated units.

Scalable video coding may refer to coding structure where one bitstream can contain multiple representations of the content, for example, at different bitrates, resolutions or frame rates. In these cases the receiver can extract the desired representation depending on its characteristics (e.g. resolution that matches best the display device). Alternatively, a server or a network element can extract the portions of the bitstream to be transmitted to the receiver depending on e.g. the network characteristics or processing capabilities of the receiver. A meaningful decoded representation can be produced by decoding only certain parts of a scalable bit stream. A scalable bitstream typically consists of a "base layer" providing the lowest quality video available and one or more enhancement layers that enhance the video quality when received and decoded together with the lower layers. In order to improve coding efficiency for the enhancement layers, the coded representation of that layer typically depends on the lower layers. E.g. the motion and mode information of the enhancement layer can be predicted from lower layers. Similarly the pixel data of the lower layers can be used to create prediction for the enhancement layer.

In some scalable video coding schemes, a video signal can be encoded into a base layer and one or more enhancement layers. An enhancement layer may enhance, for example, the temporal resolution (i.e., the frame rate), the spatial resolution, or simply the quality of the video content represented by another layer or part thereof. Each layer together with all its dependent layers is one representation of the video signal, for example, at a certain spatial resolution, temporal resolution and quality level. In this document, we refer to a scalable layer together with all of its dependent layers as a "scalable layer representation". The portion of a scalable bitstream corresponding to a scalable layer representation can be extracted and decoded to produce a representation of the original signal at certain fidelity.

Scalability modes or scalability dimensions may include but are not limited to the following:

Quality scalability: Base layer pictures are coded at a lower quality than enhancement layer pictures, which may be achieved for example using a greater quantization parameter value (i.e., a greater quantization step size for transform coefficient quantization) in the base layer than in the enhancement layer. Quality scalability may be further categorized into fine-grain or fine-granularity scalability (FGS), medium-grain or medium-granularity scalability (MGS), and/or coarse-grain or coarse-granularity scalability (CGS), as described below.

Spatial scalability: Base layer pictures are coded at a lower resolution (i.e. have fewer samples) than enhancement layer pictures. Spatial scalability and quality scalability, particularly its coarse-grain scalability type, may sometimes be considered the same type of scalability.

Bit-depth scalability: Base layer pictures are coded at lower bit-depth (e.g. 8 bits) than enhancement layer pictures (e.g. 10 or 12 bits).

Dynamic range scalability: Scalable layers represent a different dynamic range and/or images obtained using a different tone mapping function and/or a different optical transfer function.

Chroma format scalability: Base layer pictures provide lower spatial resolution in chroma sample arrays (e.g. coded in 4:2:0 chroma format) than enhancement layer pictures (e.g. 4:4:4 format).

Color gamut scalability: enhancement layer pictures have a richer/broader color representation range than that of the base layer pictures—for example the enhancement layer may have UHDTV (ITU-R BT.2020) color gamut and the base layer may have the ITU-R BT.709 color gamut.

View scalability, which may also be referred to as multiview coding. The base layer represents a first view, whereas an enhancement layer represents a second view. A view may be defined as a sequence of pictures representing one camera or viewpoint. It may be considered that in stereoscopic or two-view video, one video sequence or view is presented for the left eye while a parallel view is presented for the right eye.

Depth scalability, which may also be referred to as depth-enhanced coding. A layer or some layers of a bitstream may represent texture view(s), while other layer or layers may represent depth view(s).

Region-of-interest scalability (as described below).

Interlaced-to-progressive scalability (also known as field-to-frame scalability): coded interlaced source content material of the base layer is enhanced with an enhancement layer to represent progressive source content. The coded interlaced source content in the base layer may comprise coded fields, coded frames representing field pairs, or a mixture of them. In the interlace-to-progressive scalability, the base-layer picture may be resampled so that it becomes a suitable reference picture for one or more enhancement-layer pictures.

Hybrid codec scalability (also known as coding standard scalability): In hybrid codec scalability, the bitstream syntax, semantics and decoding process of the base layer and the enhancement layer are specified in different video coding standards. Thus, base layer pictures are coded according to a different coding standard or format than enhancement layer pictures. For example, the base layer may be coded with H.264/AVC and an enhancement layer may be coded with an HEVC multi-layer extension.

It should be understood that many of the scalability types may be combined and applied together. For example color gamut scalability and bit-depth scalability may be combined.

The term layer may be used in context of any type of scalability, including view scalability and depth enhancements. An enhancement layer may refer to any type of an enhancement, such as SNR, spatial, multiview, depth, bit-depth, chroma format, and/or color gamut enhancement. A base layer may refer to any type of a base video sequence, such as a base view, a base layer for SNR/spatial scalability, or a texture base view for depth-enhanced video coding.

Some scalable video coding schemes may require IRAP pictures to be aligned across layers in a manner that either all pictures in an access unit are IRAP pictures or no picture in an access unit is an IRAP picture. Other scalable video coding schemes, such as the multi-layer extensions of HEVC, may allow IRAP pictures that are not aligned, i.e. that one or more pictures in an access unit are IRAP pictures, while one or more other pictures in an access unit are not IRAP pictures. Scalable bitstreams with IRAP pictures or similar that are not aligned across layers may be used for example for providing more frequent IRAP pictures in the base layer, where they may have a smaller coded size due to e.g. a smaller spatial resolution. A process or mechanism for layer-wise start-up of the decoding may be included in a video decoding scheme. Decoders may hence start decoding of a bitstream when a base layer contains an IRAP picture and step-wise start decoding other layers when they contain IRAP pictures. In other words, in a layer-wise start-up of the decoding mechanism or process, decoders progressively increase the number of decoded layers (where layers may represent an enhancement in spatial resolution, quality level, views, additional components such as depth, or a combination) as subsequent pictures from additional enhancement layers are decoded in the decoding process. The progressive increase of the number of decoded layers may be perceived for example as a progressive improvement of picture quality (in case of quality and spatial scalability).

A sender, a gateway, a client, or another entity may select the transmitted layers and/or sub-layers of a scalable video bitstream. Terms layer extraction, extraction of layers, or layer down-switching may refer to transmitting fewer layers than what is available in the bitstream received by the sender, the gateway, the client, or another entity. Layer up-switching may refer to transmitting additional layer(s) compared to those transmitted prior to the layer up-switching by the sender, the gateway, the client, or another entity, i.e. restarting the transmission of one or more layers whose transmission was ceased earlier in layer down-switching. Similarly to layer down-switching and/or up-switching, the sender, the gateway, the client, or another entity may perform down- and/or up-switching of temporal sub-layers. The sender, the gateway, the client, or another entity may also perform both layer and sub-layer down-switching and/or up-switching. Layer and sub-layer down-switching and/or up-switching may be carried out in the same access unit or alike (i.e. virtually simultaneously) or may be carried out in different access units or alike (i.e. virtually at distinct times).

Scalability may be enabled in two basic ways. Either by introducing new coding modes for performing prediction of pixel values or syntax from lower layers of the scalable representation or by placing the lower layer pictures to a reference picture buffer (e.g. a decoded picture buffer, DPB) of the higher layer. The first approach may be more flexible and thus may provide better coding efficiency in most cases. However, the second, reference frame based scalability, approach may be implemented efficiently with minimal changes to single layer codecs while still achieving majority of the coding efficiency gains available. Essentially a reference frame based scalability codec may be implemented by utilizing the same hardware or software implementation for all the layers, just taking care of the DPB management by external means.

A scalable video encoder for quality scalability (also known as Signal-to-Noise or SNR) and/or spatial scalability may be implemented as follows. For a base layer, a non-scalable video encoder and decoder may be used. The reconstructed/decoded pictures of the base layer are included in the reference picture buffer and/or reference picture lists for an enhancement layer. In case of spatial scalability, the reconstructed/decoded base-layer picture may be upsampled prior to its insertion into the reference picture lists for an enhancement-layer picture. The base layer decoded pictures may be inserted into a reference picture list(s) for coding/decoding of an enhancement layer picture similarly to the decoded reference pictures of the enhancement layer. Consequently, the encoder may choose a base-layer reference picture as an inter prediction reference and indicate its use with a reference picture index in the coded bitstream. The decoder decodes from the bitstream, for example from a reference picture index, that a base-layer picture is used as an inter prediction reference for the enhancement layer. When a decoded base-layer picture is used as the prediction reference for an enhancement layer, it is referred to as an inter-layer reference picture.

While the previous paragraph described a scalable video codec with two scalability layers with an enhancement layer and a base layer, it needs to be understood that the description can be generalized to any two layers in a scalability hierarchy with more than two layers. In this case, a second enhancement layer may depend on a first enhancement layer in encoding and/or decoding processes, and the first enhancement layer may therefore be regarded as the base layer for the encoding and/or decoding of the second enhancement layer. Furthermore, it needs to be understood that there may be inter-layer reference pictures from more than one layer in a reference picture buffer or reference picture lists of an enhancement layer, and each of these inter-layer reference pictures may be considered to reside in a base layer or a reference layer for the enhancement layer being encoded and/or decoded. Furthermore, it needs to be understood that other types of inter-layer processing than reference-layer picture upsampling may take place instead or additionally. For example, the bit-depth of the samples of the reference-layer picture may be converted to the bit-depth of the enhancement layer and/or the sample values may undergo a mapping from the color space of the reference layer to the color space of the enhancement layer.

Inter-layer prediction may be defined as prediction in a manner that is dependent on data elements (e.g., sample values or motion vectors) of reference pictures from a different layer than the layer of the current picture (being encoded or decoded). Many types of inter-layer prediction exist and may be applied in a scalable video encoder/decoder. The available types of inter-layer prediction may for example depend on the coding profile according to which the bitstream or a particular layer within the bitstream is being encoded or, when decoding, the coding profile that the bitstream or a particular layer within the bitstream is indicated to conform to. Alternatively or additionally, the available types of inter-layer prediction may depend on the types of scalability or the type of an scalable codec or video coding standard amendment (e.g. SHVC, MV-HEVC, or 3D-HEVC) being used.

A direct reference layer may be defined as a layer that may be used for inter-layer prediction of another layer for which the layer is the direct reference layer. A direct predicted layer may be defined as a layer for which another layer is a direct reference layer. An indirect reference layer may be defined as a layer that is not a direct reference layer of a second layer but is a direct reference layer of a third layer that is a direct reference layer or indirect reference layer of a direct reference layer of the second layer for which the layer is the indirect reference layer. An indirect predicted layer may be defined as a layer for which another layer is an indirect reference layer. An independent layer may be defined as a layer that does not have direct reference layers. In other words, an independent layer is not predicted using inter-layer prediction. A non-base layer may be defined as any other layer than the base layer, and the base layer may be defined as the lowest layer in the bitstream. An independent non-base layer may be defined as a layer that is both an independent layer and a non-base layer.

A neural network (NN) is a computation graph comprising several layers of computation. Each layer comprises one or more units, where each unit performs an elementary computation. A unit is connected to one or more other units, and the connection may have associated a weight. The weight may be used for scaling the signal passing through the associated connection. Weights are usually learnable parameters, i.e., values which can be learned from training data. There may be other learnable parameters, such as those of batch-normalization layers.

Two example architectures for neural networks are feed-forward and recurrent architectures. Feed-forward neural networks are such that there is no feedback loop: each layer takes input from one or more of the preceding layers and provides its output as the input for one or more of the subsequent layers. Also, units inside a certain layers take input from units in one or more of preceding layers, and provide output to one or more of following layers.

Initial layers (those close to the input data) extract semantically low-level features such as edges and textures in images, and intermediate and final layers extract more high-level features. After the feature extraction layers there may be one or more layers performing a certain task, such as classification, semantic segmentation, object detection, denoising, style transfer, super-resolution, etc. In recurrent neural nets, there is a feedback loop, so that the network becomes stateful, i.e., it is able to memorize information or a state.

Neural networks are being utilized in an ever increasing number of applications for many different types of device, such as mobile phones. Examples include image and video analysis and processing, social media data analysis, device usage data analysis, etc.

A property of neural nets (and other machine learning tools) is that they are able to learn properties from input data, for example in supervised way or in unsupervised way. Such learning may be a result of a training algorithm, or of a meta-level neural network providing the training signal.

In general, the training algorithm may include changing some properties of the neural network so that its output is as close as possible to a desired output. For example, in the case of classification of objects in images, the output of the neural network can be used to derive a class or category index which indicates the class or category that the object in the input image belongs to. Training may include minimizing or decreasing the output's error, also referred to as the loss. Examples of losses are mean squared error, cross-entropy, etc. In deep learning techniques, training may be an iterative process, where at each iteration the algorithm modifies the weights of the neural net to make a gradual improvement of the network's output, i.e., to gradually decrease the loss.

In context of training neural networks, an epoch refers to the time during which a neural network is used on all the training data, and it may comprise a plurality of iterations. An iteration refers to the time during which a neural network is used on a subset of the whole training data, typically referred to as a batch or mini-batch of data. Typically, an update to the weights of the neural network is performed at each iteration. In particular, a batch of data is input to the network, an output is obtained from the network, a loss is computed from the output, gradients of the loss with respect to the weights are computed, and weigh updates are determined based on the computed gradients.

Herein, the terms "model", "neural network", "neural net" and "network" may be used interchangeably, and also the weights of neural networks are sometimes referred to as learnable parameters or simply as parameters.

Training a neural network is an optimization process, but the final goal is different from the typical goal of optimization. In normal optimization, the only goal is to minimize a functional. In machine learning, the goal of the optimization or training process is to make the model learn the properties of the data distribution from a limited training dataset. In other words, the goal is to learn to use a limited training dataset in order to learn to generalize to previously unseen data, i.e., data which was not used for training the model. This is usually referred to as generalization. In practice, data may be split into at least two sets, the training set and the validation set. The training set is used for training the network, i.e., to modify its learnable parameters in order to minimize the loss. The validation set may be used for checking the performance of the network on data which was not used to minimize the loss, as an indication of the final performance of the model. In particular, the errors on the training set and on the validation set are monitored during the training process to understand the following things:

If the network is learning at all—in this case, the training set error should decrease, otherwise the model is in the regime of underfitting.

If the network is learning to generalize—in this case, also the validation set error needs to decrease and to be not too much higher than the training set error. If the training set error is low, but the validation set error is much higher than the training set error, or it does not decrease, or it even increases, the model is in the regime of overfitting. This means that the model has just memorized the training set's properties and performs well only on that set, but performs poorly on a set not used for tuning its parameters.

Referring back to the hybrid video compression described above, it was described how the intra- (i.e. spatial) and inter- (e.g. temporal) prediction processes are performed, besides at the decoder, but also in the encoder, more specifically in the "decoding loop" of the encoder, in order to compute the residual. Decoding is performed in certain scan order, e.g. coding units may be coded in raster-scan order within a coding tree unit, and coding tree units may be coded in raster-scan order within a tile. Therefore, for each block to be predicted, the already reconstructed pixels may be those above and on the left of the block. Out of all the already reconstructed pixels above and on the left of the block to be predicted, only a few, such as 2 or 4, rows and columns may be used for the prediction.

Figure 5:
FIG. 5 shows an example of intra-prediction process for a block to be predicted.

Thus, intra-prediction may involve using said few rows and columns of pixels above and on the left of the block to be predicted for deriving how the block may look like. Blocks may be relatively small, such as 8 by 8 pixels, thus the intra prediction process may reduce to predict a small image pattern such as an edge or textural detail or even a constant/homogeneous area. FIG. 5 shows an example of the intra-prediction input comprising said few rows and columns of pixels above and on the left of the area of a block to be predicted and an output for said block.

The intra-prediction process is usually performed using algorithmic approaches (i.e., not using learned approaches). Intra-prediction typically involves pre-defined prediction modes, where each prediction mode refers to a different image pattern, such as homogeneous content (the predicted area has same constant value, which may be derived e.g. to be equal to the average sample value of selected samples of the neighboring blocks or as the left and top already reconstructed pixels), deriving a smoothly changing prediction block (e.g. planar mode of H.264/AVC or HEVC), or a directional mode. The directionality of a prediction mode for intra prediction, i.e. the prediction direction to be applied in a particular prediction mode, may be e.g. vertical, horizontal, or a selected diagonal mode, corresponding to different directional prediction angles. Directional prediction modes may be considered to correspond to edges with different angles/orientations. During encoding, all or several prediction modes are tried, and the best one is selected based on, for example, the mean squared error (MSE) between the predicted block and the real block. The prediction mode is then signaled to the decoder, for example by including it into the block's residual bitstream.

The goal of the intra-prediction process is to obtain the smallest possible prediction error or residual, thus requiring less bits to encode the intra frames which consume a significant part of the entire video's bitstream. However, the above-described algorithmic approach has been subject to such an ultimate studying and development that it has saturated in terms of prediction accuracy. Therefore, further development could be achieved using learned approaches.

Now an enhanced method for using neural networks for the intra-prediction process is introduced.

Figure 6:
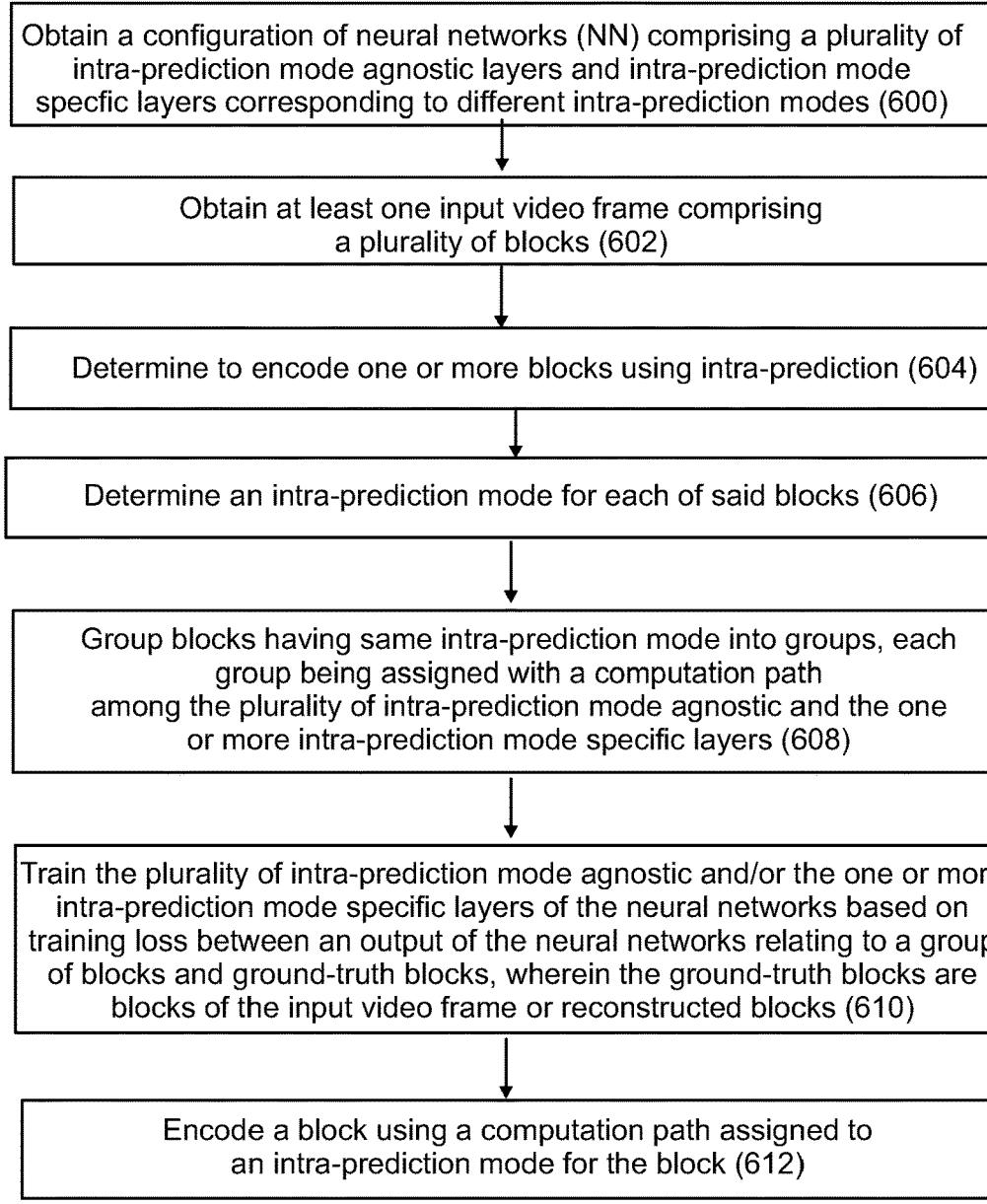
FIG. 6 shows a flow chart of an encoding method according to an embodiment of the invention.

The method, which is depicted in the flow chart of FIG. 6, comprises obtaining (600) a configuration of at least one neural network comprising a plurality of initial intra-prediction mode agnostic and one or more intra-prediction mode specific layers, the one or more intra-prediction mode specific layers corresponding to different intra-prediction modes; obtaining (602) at least one input video frame comprising a plurality of blocks; determining (604) to encode one or more blocks using intra prediction; determining (606) an intra-prediction mode for each of said one or more block; grouping (608) blocks having same intra-prediction mode into groups, each group being assigned with a computation path among the plurality intra-prediction mode agnostic and the one or more intra-prediction mode specific layers; training (610) the plurality of intra-prediction mode agnostic and/or the one or more intra-prediction mode specific layers of the neural networks based on a training loss between an output of the neural networks relating a group of blocks and ground-truth blocks, wherein the ground-truth blocks are either blocks of the input video frame or reconstructed blocks; and encoding (612) a block using a computation path assigned to an intra-prediction mode for the block.

According to an embodiment, the method further comprises using, in response to the a configuration of at least one neural network comprising a pre-trained neural network, blocks of the input video frame as the ground-truth blocks. Thus, when the neural net is pre-defined, or when the neural net is pre-trained by the encoder and transmitted to the decoder, blocks of the input video frame may be used as ground-truth blocks used in the training phase (610).

Since intra-prediction neural networks in the encoder and the decoder are preferably aligned (i.e., operate with same parameters), intra-prediction neural networks in the encoder and the decoder may be trained in the exact same way, or at least substantially in the same way. According to an embodiment, the encoder indicates, in or along a bitstream, information indicative of which blocks are to be used for training. Herein, the encoder may encode the training blocks (i.e. the group of blocks using the same intra-prediction mode) with higher quality. In an embodiment, the decoded or reconstructed blocks corresponding to the encoded training blocks are used by the decoder as ground-truth data to compute the training loss. Likewise, in an embodiment, the encoder uses the decoded or reconstructed blocks corresponding to these encoded training blocks as ground-truth, instead of the original blocks.

Figure 7:
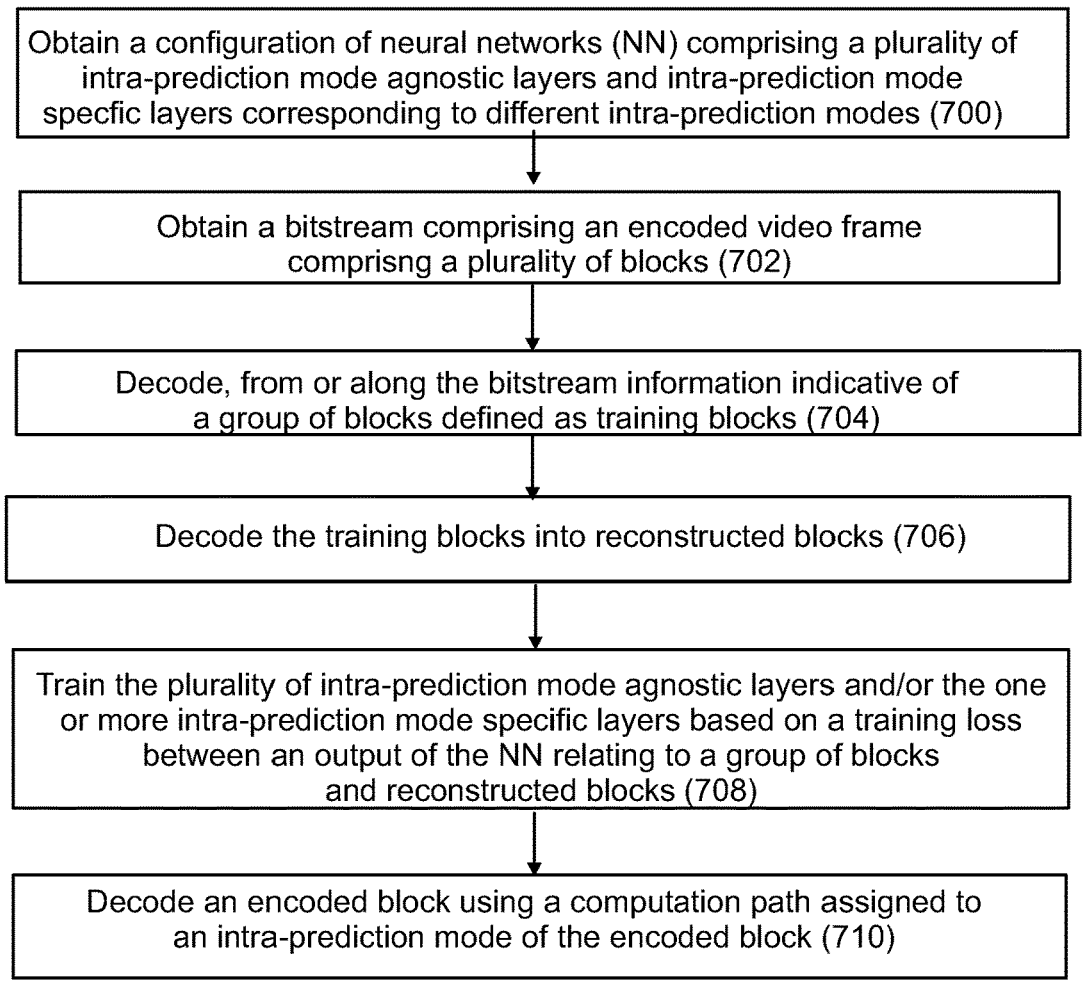
FIG. 7 shows a flow chart of a decoding method according to an embodiment of the invention.

A respective decoding method, which is depicted in the flow chart of FIG. 7, comprises obtaining (700) a configuration of at least one neural network comprising a plurality of intra-prediction mode agnostic layers and one or more intra-prediction mode specific layers corresponding to different intra-prediction modes; obtaining (702) a bitstream comprising an encoded video frame, wherein the encoded video frame comprises a plurality of; decoding (704), from or along the bitstream information indicative of a group of blocks defined as training blocks; decoding (706) the training blocks into reconstructed blocks; training (708) the plurality intra-prediction mode agnostic layers and/or the one or more intra-prediction mode specific layers of the neural networks based on a training loss between an output of the neural networks relating a group of blocks and the reconstructed blocks; and decoding (710) an encoded block using a computation path assigned to an intra-prediction mode of the encoded block.

Accordingly, the methods relate to video compression using neural networks for the intra-prediction process as one component of the video codec. Thus, the learning abilities of neural networks are utilized for performing the intra-prediction process in video compression, wherein prediction modes are exploited in order to adapt the neural networks to the specific content in the most effective way. In other words, the neural networks are adapted to the prediction mode information at the inference stage.

It needs to be understood that even though figures and embodiments are described with reference to a block or a picture, the embodiments can be applied on the basis of any spatial units, ranging from a block to a picture. For example, the embodiments can be similarly realized for a slice. Embodiments can be also applied to multiple intra-frames. For example, training blocks for a particular intra-prediction type may be collected from a plurality of intra-frames, for example from a plurality of consecutive intra frames that may belong to a same scene.

The neural net may be delivered to the encoder and the decoder for example in one of the following ways:
- The neural net may be pre-defined e.g. in a coding standard and hence known by both the encoder and the decoder.
- The neural network may be pre-trained. Pre-training may be performed by an entity external to the encoder and the decoder and delivered to both the encoder and the decoder in advance of the encoding or decoding a bitstream.
- The pre-training may be performed by the encoder. The decoder may have means to obtain the pre-trained network. For example, the network may be included in or along the bitstream, out of which the decoder decodes the neural net. For example, a specific parameter set, e.g. referred to as neural net parameter set, may be specified for the delivery of the neural net in or along the bitstream. The use of the specific neural net parameter set may be indicated e.g. in sequence, picture, or slice level, e.g. in the sequence parameter set, the picture parameter set, or the slice header, respectively.

The embodiments are not limited to any particular neural network representation syntax, when a neural net is delivered to the encoder and/or to the decoder. The neural net type (e.g. fully convolutional neural net), essential parameters (e.g. the number of layers) and the parameters or weights for the neural net may be included in the neural network representation.

The embodiments are neither limited to any particular type of a neural network.

In the following, the steps of the method shown in FIGS. 6 and 7 and embodiments related thereto are described more in detail.

A Pre-Trained Configuration of Neural Networks Comprising a Plurality of Prediction Mode Agnostic Layers and a Plurality of Prediction Mode Dependent Layers Corresponding to Different Intra-Prediction Modes (600, 700)

Herein, the term "prediction mode agnostic layer" refers to a set of layers of the intra-prediction neural network comprising data blocks that may belong to any of the intra-prediction modes. The term "prediction mode dependent layer" refers to a set of layers of the intra-prediction neural network which process blocks belonging to a specific intra-prediction mode. For example, in response to an encoder or decoder determining to use a first intra-prediction mode for a set of blocks, the intra-prediction neural network may use the intra-prediction mode agnostic layer(s) and a first set of intra-prediction mode dependent layers determined based on the first intra-prediction mode. In response to determining to use a second intra-prediction mode, the intra-prediction neural network may use the intra-prediction mode agnostic layers and a second set of intra-prediction mode dependent layers, determined based on the second intra-prediction mode. In one embodiment, the set of intra-prediction mode agnostic layers comprises one or more initial layers of the network, e.g., layers 1 to N at the input of the network, where N is the number of initial layers a. In one embodiment, the set of intra-prediction mode specific layers comprises one or more final layers, e.g. layers K−M+1 to K at the output of the neural network, where M K is the total number of layers for a particular prediction mode. Partition to intra-prediction mode agnostic and specific parts may not always be based on layers and many different levels of partitioning may be applied, for example in some embodiments the partitioning may be on a filter level or even at single neuron level. In general, there may be an intra-prediction mode agnostic portion of the neural network and one or more intra-prediction mode specific portions of the network.

In an intra-prediction process, a video frame may be divided into a set of blocks. Each block may be coded separately. An encoder may determine or may be configured to encode certain frames as intra-coded frames. For example, the first frame in a bitstream is typically an intra-coded frame. Intra-coded frames may be used to facilitate random-accessing a bitstream, and hence they may be encoded and inserted to the bitstream in a periodic manner. Furthermore, intra-coded frames may be coded for scene cut positions, since inter-prediction is not likely to be beneficial between scenes of different content. In some cases, an encoder may determine to, or may be configured to, carry out gradual decoding refresh, wherein the picture content is refreshed over a multitude of pictures in a manner that the refreshed region is growing in decoding order of pictures and the coding blocks within the refreshed region are either coded with the intra mode or predicted from the refreshed region of the earlier pictures, in decoding order, among the multitude of pictures. For inter-coded frames, the video codec decides whether the block is to be encoded in intra-mode or in inter-mode, for example by first checking whether the inter-prediction satisfies the bitrate and Peak-to-Signal Noise (PSNR) requirements imposed by the user for the video to be compressed. If not, the block is encoded in intra-mode, i.e., using only pixels in the current frame which have already been decoded and reconstructed. Due to the typical raster scan order in decoding, the decoded and reconstructed pixels usually locate on top rows and left columns with respect to the blocks to be predicted.

Codecs may consider N intra-prediction modes, such as N=35, where a mode may correspond to a certain angle of a direction or an edge, e.g., horizontal, vertical, or any other angle.

For providing a configuration of neural network(s) for different intra-prediction modes, the neural network architecture may be pre-trained in an offline stage on a certain training dataset which may not necessarily include the video that is to be encoded. The neural network may have an architecture which better exploits the availability of information about intra-prediction modes.

According to an embodiment, the configuration of neural networks may comprise a mode agnostic section of layer(s)

and a mode dependent or mode specific section of layer(s). In one embodiment, there may be an initial section of initial layers which are executed or trained for all prediction modes, and several final layers which are specific to each prediction mode.

According to another embodiment, the configuration of neural networks may comprise a plurality of different neural networks for different prediction modes. For example, there may be as many neural networks as there are prediction modes, and each group of blocks may be used to train one of those neural networks. This may add prediction capabilities but it may also increase the memory footprint and the computational complexity of the whole system.

Figure 8:
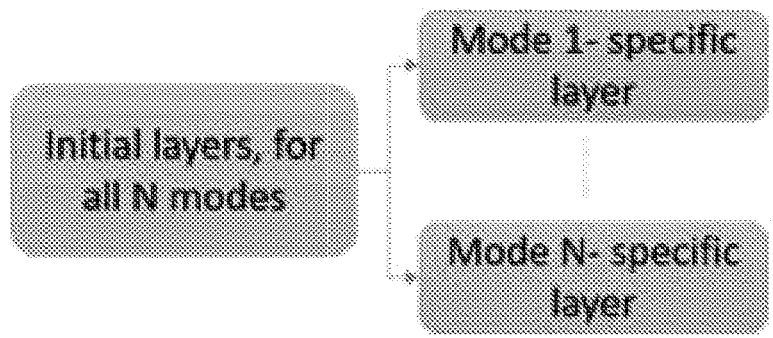
FIG. 8 shows a schematic diagram of neural network for intra-prediction according to an embodiment of the invention.

FIG. 8 illustrates the configuration of neural networks according to the first option: single initial section of initial layers shared by all or multiple prediction modes, and N final layers specific to or dependent on the corresponding prediction modes.

The network may be trained offline in a similar way as the inference-stage fine-tuning process is performed. It is assumed that a training dataset of images or frames is available. The training images may be input to a traditional codec, e.g., HEVC, which uses the traditional intra-prediction algorithm for generating the input blocks, the intra-predicted blocks, and the prediction modes. The input block may comprise previously-reconstructed pixels and the missing pixels to be predicted. Thus, the training data may comprise a set of samples, where each sample is the ground-truth block (i.e., the ground-truth data to be predicted), the input block to the intra-prediction, the output block predicted by the traditional algorithm, and the prediction-mode which was selected by the traditional algorithm as the best prediction mode out of all or some of the available prediction modes.

Determining an Intra-Prediction Mode for Each Block (606)

For the current frame(s), the intra-prediction mode for each block may be determined, for example using (algorithmic) method(s) provided by a video coding standard (e.g. HEVC). This may involve trying a plurality of different modes, such as pre-defined prediction modes, smoothly changing prediction modes or directional modes, and selecting the most suitable mode e.g. based on the MSE of the modes between the predicted block and the real block. The selected prediction mode represents the ground-truth mode.

Ground-Truth Computation Path Labels (608)

When a frame is to be encoded as intra-frame, a traditional intra-prediction process (e.g., according to the HEVC standard) may be run in order to determine a computation path for the different intra-prediction modes. A computation path may include information of the relationships between different mode agnostic or mode dependent layers. For example, to which mode dependent layer an output of a mode agnostic layer should be provided. The computation paths may be expressed by "computation-path ground-truth labels" or simply "computation path labels". For example, computation-path ground-truth labels correspond to intra-prediction modes, which can then be used in the neural network optimization process to decide the computational path to be taken by the corresponding block. In other words, in the neural network optimization process the intra-prediction mode is selected for a particular input block by selecting the most suitable computation path among the mode agnostic layer(s) and mode dependent layer(s), for example from the plurality of mode agnostic layers to a particular mode dependent layer. Herein, a traditional intra-prediction process may be run for each block and by considering all possible prediction modes. Thus, for each input block, there may be N output predicted blocks. A selection parameter, such as MSE, is computed between the input block and each of the N output predicted blocks. The output predicted block with the best value of the selection parameter, such as the lowest MSE value, is selected, and the computation-path label, for example a ground-truth computation path (GT-CP label), corresponding the intra-prediction mode of the selected block may be assigned to the particular input block.

Figure 9:
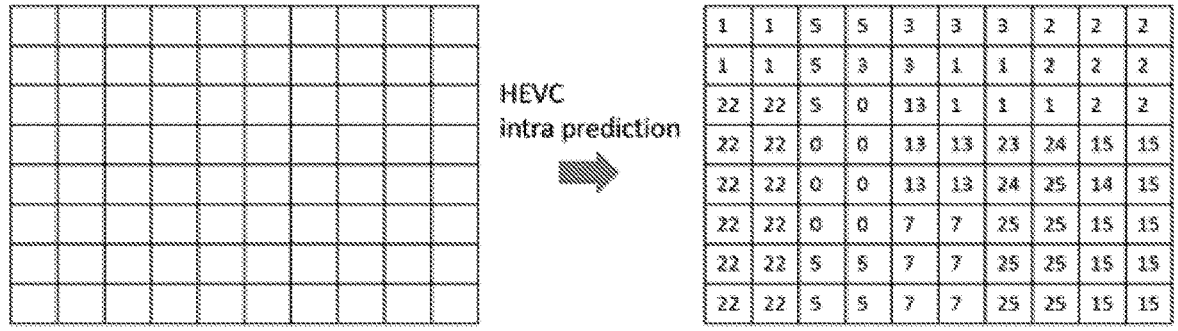
FIG. 9 shows an example of determining ground-truth computation-path labels for blocks of a frame according to an embodiment of the invention.

FIG. 9 illustrates the determining of the computation paths, for example GT-CP labels. An input frame shown on the left side is divided into input blocks. The above-described process of selecting the most suitable intra-prediction mode, and thereby the most suitable computation path among the mode agnostic and mode dependent layer(s), for example from the one or more initial layers to a particular final layer, is carried out, wherein a traditional intra-prediction process, such as HEVC intra-prediction, may be applied. The output frame on the right side shows the ground-truth computation-path (GT-CP) labels generated for all blocks of the intra-frame. In some embodiments all blocks of the intra frame(s) may not be assigned an intra-prediction mode or a computation path. For example, an encoder could determine not to encode such blocks or to encode them by other means, and therefore not to assign an intra-prediction mode or a computation path. For example, an encoder may indicate which image segments (e.g. slices or tile groups) of a picture are intra-coded, and may additionally indicate which intra-coded image segments are assigned a computation path.

Grouping the Blocks Having the Same Intra-Prediction Mode into Groups (608)

The encoder proceeds by grouping blocks assigned to the same prediction mode together under the same prediction mode label. In other words, blocks in the current intra-frame having been assigned the same computation path, e.g. the same ground-truth computation-path label are included in a common group. The groups will then represent the training dataset for optimization, wherein blocks belonging to the same group are used for training both mode agnostic and mode dependent layers, for example the initial layers and the final layer associated to the particular GT-CP label.

Figure 10:
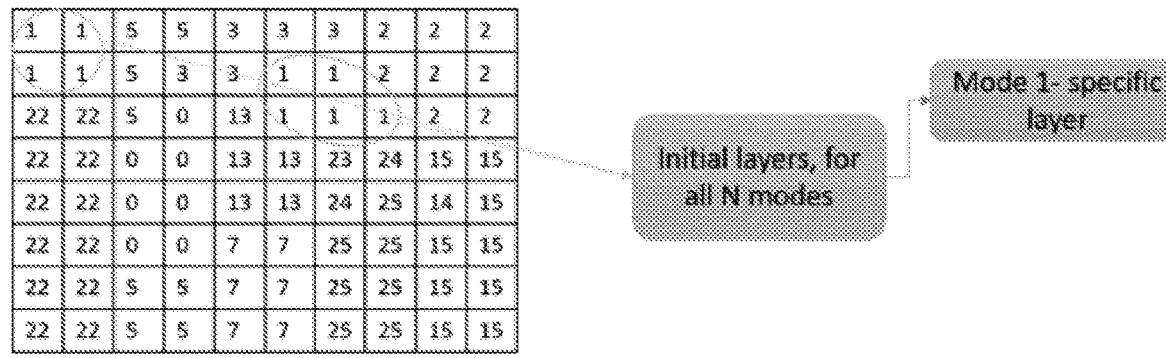
FIG. 10 shows an example of grouping blocks having the same ground-truth computation-path label according to an embodiment of the invention.

FIG. 10 illustrates the grouping process, blocks of the output frame of FIG. 9 having GT-CP label value of 1, referring to intra-prediction mode 1, are grouped together. These blocks, or a subset thereof, are then used as a training dataset for optimizing the computation-path among the mode agnostic layer(s) and mode 1-dependent layer(s), for example from the plurality of initial layers to a mode 1-specific final layer.

According to an embodiment, the grouping of blocks according to the GT-CP labels is performed over multiple intra-frames instead of over the single intra-frame. Thus, the training blocks may be derived from multiple nearby intra-frames, thereby providing more training data for each type of block.

Embodiments have been described above in relation to intra-frame(s). It needs to be understood that embodiments generally apply to intra-coded blocks or image segments (such as slices or tile groups) of pictures of any type. Moreover, embodiments generally apply to any number of frames, i.e. training may be performed from a multitude of frames. For example, training may be performed on the basis of intra-coded blocks of a refreshed region of a gradual decoding refresh period of frames.

Training the Plurality of Initial Layers and the Particular Final Layer of the Neural Networks (610)

According to an embodiment, the training comprises using reconstructed pixels on top rows and left columns with respect to the area to be predicted as input, and the original content of the area to be predicted as the ground-truth for predicting the training loss. For example, the training loss may be the MSE between the output of the neural network (i.e. the prediction) and the ground-truth block content. It is noted that herein the ground-truth block content and the ground-truth computation-path label represent different things: the ground-truth block content is used for computing the training loss, whereas the ground-truth computation-path label is used to decide the computation-path; in other words, which final layer to use during training.

According to an embodiment, a training cycle of the initial layers and the particular final layer is carried out as intra-prediction mode-specifically. For example, first blocks of mode 1 are used for training mode agnostic layers and the mode 1-specific layers, then blocks of mode 2 are used for training the mode agnostic layers and the mode 2-specific layers, and so on, until all or a predetermined subset of modes have been considered. This may happen within one training cycle, i.e., until all training data is used, where after a new training cycle may be executed.

According to another embodiment, the training of the mode agnostic layers and the particular mode dependent final layer involves simultaneously a plurality of intra-prediction modes. Thus, the training data may be shuffled such that at each training iteration multiple modes may be considered for training the neural network. In other words, the training batch may contain data from different modes.

According to an embodiment, the training comprises using a lower learning rate for the mode agnostic and mode dependent layers with respect to the learning rate used in the offline pre-training stage. An example of this approach is described herein for a plurality of initial mode agnostic layers and a mode specific final layer. The learning rate for the mode-specific final layer may be different than the one used for the initial layers. For example, during pre-training an initial learning rate of 0.1 may be used, wherein the initial learning rate may eventually be decreased during the pre-training, for example using any known learning rate decay techniques. Thereafter, during training of the initial layers an initial learning rate of 0.001 may be used and during training of the mode-specific layers an initial learning rate of 0.0001 may be used.

According to an embodiment, the training comprises using all or a subset of reconstructed pixels. When using all the reconstructed pixels, the neural network may comprise also recurrent layers which allow for variable-size of input data. Using all reconstructed pixels may be beneficial in that it would provide the neural network with much more context on which to base the prediction.

According to an embodiment, the training comprises using the area to be predicted which is padded with a value, such as zero. This may be beneficial for neural networks comprising convolutional layers, as the spatial relations between the reconstructed pixels and the pixels to be predicted would be preserved.

According to an embodiment, the training comprises using the area to be predicted which has been filled with value(s) output by another algorithm, such as a prediction from another non-learned (e.g., traditional intra-prediction performed by HEVC or other codecs) or learned algorithm (e.g., a neural network). This may be beneficial especially for models which do not have a large receptive field in their last layers. In case the area to be predicted is filled with value(s) from the traditional codec's intra prediction, this may be readily available from the labeling of computation-paths. In other words, the traditional codec's intra prediction may be performed only once for a certain block and then it may be used both for obtaining the GT-CP labels and for using the prediction as additional input to the intra prediction neural network. In particular, the additional input to the neural network may be the prediction output by the traditional codec using the mode corresponding to the previously-determined GT-CP label.

According to an embodiment, if the grouping of blocks according to the GT-CP labels and the adaptation is performed over a single intra-frame, the following intra-frames are intra-predicted using the previously-adapted neural network.

According to an embodiment, if the grouping of blocks according to the GT-CP labels and the adaptation is performed over multiple intra-frames instead of over the single intra-frame, the intra-prediction for said multiple frames is performed using the adapted network.

According to an embodiment, the training is carried out for intra frames at an interval of predetermined number of consecutive intra frames. Thus, the neural network adaptation process needs to be done only once every few intra-frames, as it is assumed that the image content for each block will not change much in short time.

According to an embodiment, the training is carried out for each intra frame, wherein training data is sent to the decoder if a predetermined accuracy improvement is achieved. Thus, the encoder may perform the adaptation continuously and decide to send (higher-quality) training blocks if the adapted neural network provides sufficient accuracy gain with respect to the bitrate overhead. Accordingly, the encoder accepts the network adaptation process if the gain in terms of rate-distortion trade-off is sufficient. When a network adaptation process is accepted, the encoder will encode the high-quality blocks used for training into the bitstream so that also the decoder can adapt its network and get aligned to the encoder. If the network adaption process is rejected, the encoder will turn back to the version of neural network before the adaptation process.

According to an embodiment, the training comprises using a subset of blocks of the current intra-frame for adaptation. For example, the encoder may be configured to use only a subset of blocks of the current intra-frame in order to keep classes (i.e., modes) balanced, i.e., having similar number of blocks for each mode.

According to an embodiment, the training comprises using a subset of blocks for training intra-prediction mode agnostic layer(s) and intra-prediction mode dependent layer(s), for example all initial layers and all final layers, without using any ground-truth computation-path label. A block in said subset would go through the initial layers and then through all the final layers and losses are computed from the final layers, differentiated with respect to the network's parameters and finally network parameters are updated according to the computed gradients. This embodiment is beneficial in case the labeling of computation-paths is too expensive to be done for all blocks (in the current frame or in multiple frames, depending on which option is chosen). Thus, a subset of blocks is labeled and used for adapting the initial layers and a mode-specific final layer, whereas another subset of blocks is not labeled and used for adapting the initial layers and the final layers. The learning rate used for these two subsets may be different, and also the learning rates for training the initial layer(s) and the final layer(s) may be different. For example, for the subset of blocks which are not labeled, the training of the initial layer(s) may have a smaller learning rate than the one used when blocks are labeled (e.g., 10 times smaller), and the training of the final layer(s) may have an even smaller learning rate (e.g., 10 times smaller than for the initial layers of the same training process).

According to an embodiment, the training comprises using a subset of modes in the current frames for adaptation. Thereafter, another subset of modes may be used in a subsequent frame. This may be beneficial for example when some modes are missing in a certain frame but are present in future frames.

Information Indicative of a Group of Blocks Defined as Training Blocks (704)

The encoder indicates in or along the bitstream information indicative of which blocks are training blocks. The decoder decodes from or along the bitstream information indicative of which blocks are training blocks and performs the fine-tuning of the neural network accordingly. According to an embodiment, the information indicative of which blocks are training blocks may comprise but is not limited to one or more of the following:

A flag for each block, which informs the decoder that the block is a training block. The flag may be arithmetically coded and arithmetic coding may be context-adaptive (e.g. based on the values of the flag for adjacent blocks and/or the quantization parameter value of the block). Consequently, the flag may be represented by a fractional bit in the bitstream. For example, the flag (which may be arithmetically coded) may be included in a coding tree unit syntax structure, which may e.g. be referred to as coding_tree_unit( ) in the syntax definitions.

A flag for an image segment, such as a slice or a tile group, which may be included in a header syntax structure for the image segment. When set, the flag may indicate that the intra-coded blocks of the image segment are training blocks. In some cases, the flag may be conditionally present only if the image segment is indicated to be intra-coded or intra-predicted.

A threshold quantization parameter (QP) value, indicative of the greatest QP for blocks that qualify as training blocks.

An area within a picture is indicated to include training blocks, while other areas of a picture may contain no training blocks. The area may for example be indicated as a width and a height in units of blocks starting from the top-left corner of a picture, or by any other suitable means.

If a block is a training block, the decoder may use it for adapting the intra-prediction neural network. In some cases, the decoder may determine whether a block is a "training block" by checking the quality level (quantization parameter) and by comparing that to an indicated or inferred threshold value. The threshold may be inferred, for example, by computing an average quality level, which may be general to all prediction-modes or specific to each prediction mode. Then, the threshold would be either the computed average value, or the computed average value plus a predefined value (or percentage of the computed average value).

According to an embodiment, the method further comprises using a decoded version of the block to be predicted as ground-truth data in the encoder and the decoder. In order to keep intra-prediction neural networks in the encoder and the decoder aligned and with same values of parameters, they need to be trained using the same input and the same ground-truth data. The input may be considered as the reconstructed data above and on the left of the block to be predicted, whereas the ground-truth data is the real content of the block to be predicted. However, the decoder is not provided with the exact real content of the block to be predicted, but the data of the block is available at the decoder side only with some encoding artifacts (e.g., quantization error). Therefore the encoder needs to use the same data, i.e., the decoded block. The block can be obtained for example by encoding and decoding the block in intra mode using the traditional prediction (e.g., HEVC) and a high encoding quality (e.g., setting a low quantization parameter for coding the residual). Alternatively, the current version of the neural network can be used for intra-prediction, wherein a high encoding quality (e.g., setting a low quantization parameter for coding the residual) is applied.

In the above, the embodiments are described as block-wise operations, but it needs to be understood that all or a subset of the operations could be performed for other units, such as entire picture(s) or individual pixels. Therefore, it is further noted that the blocks, such as the input block, prediction block, prediction error block and reconstructed prediction error block, may as well be referred to both in the description and in the claims as signals, such as input signal, prediction signal, prediction error signal and reconstructed prediction error signal.

Figure 11:
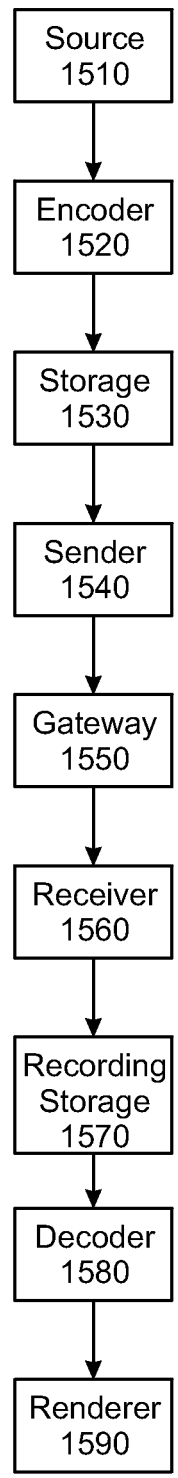
FIG. 11 shows a schematic diagram of an example multimedia communication system within which various embodiments may be implemented.

FIG. 11 is a graphical representation of an example multimedia communication system within which various embodiments may be implemented. A data source 1510 provides a source signal in an analog, uncompressed digital, or compressed digital format, or any combination of these formats. An encoder 1520 may include or be connected with a pre-processing, such as data format conversion and/or filtering of the source signal. The encoder 1520 encodes the source signal into a coded media bitstream. It should be noted that a bitstream to be decoded may be received directly or indirectly from a remote device located within virtually any type of network. Additionally, the bitstream may be received from local hardware or software. The encoder 1520 may be capable of encoding more than one media type, such as audio and video, or more than one encoder 1520 may be required to code different media types of the source signal. The encoder 1520 may also get synthetically produced input, such as graphics and text, or it may be capable of producing coded bitstreams of synthetic media. In the following, only processing of one coded media bitstream of one media type is considered to simplify the description. It should be noted, however, that typically real-time broadcast services comprise several streams (typically at least one audio, video and text sub-titling stream). It should also be noted that the system may include many encoders, but in the figure only one encoder 1520 is represented to simplify the description without a lack of generality. It should be further understood that, although text and examples contained herein may specifically describe an encoding process, one skilled in the art would understand that the same concepts and principles also apply to the corresponding decoding process and vice versa.

The coded media bitstream may be transferred to a storage 1530. The storage 1530 may comprise any type of mass memory to store the coded media bitstream. The format of the coded media bitstream in the storage 1530 may be an elementary self-contained bitstream format, or one or more coded media bitstreams may be encapsulated into a container file, or the coded media bitstream may be encapsulated into a Segment format suitable for DASH (or a similar streaming system) and stored as a sequence of Segments. If one or more media bitstreams are encapsulated in a container file, a file generator (not shown in the figure) may be used to store the one more media bitstreams in the file and create file format metadata, which may also be stored in the file. The encoder 1520 or the storage 1530 may comprise the file generator, or the file generator is operationally attached to either the encoder 1520 or the storage 1530. Some systems operate "live", i.e. omit storage and transfer coded media bitstream from the encoder 1520 directly to the sender 1540. The coded media bitstream may then be transferred to the sender 1540, also referred to as the server, on a need basis. The format used in the transmission may be an elementary self-contained bitstream format, a packet stream format, a Segment format suitable for DASH (or a similar streaming system), or one or more coded media bitstreams may be encapsulated into a container file. The encoder 1520, the storage 1530, and the server 1540 may reside in the same physical device or they may be included in separate devices. The encoder 1520 and server 1540 may operate with live real-time content, in which case the coded media bitstream is typically not stored permanently, but rather buffered for small periods of time in the content encoder 1520 and/or in the server 1540 to smooth out variations in processing delay, transfer delay, and coded media bitrate.

The server 1540 sends the coded media bitstream using a communication protocol stack. The stack may include but is not limited to one or more of Real-Time Transport Protocol (RTP), User Datagram Protocol (UDP), Hypertext Transfer Protocol (HTTP), Transmission Control Protocol (TCP), and Internet Protocol (IP). When the communication protocol stack is packet-oriented, the server 1540 encapsulates the coded media bitstream into packets. For example, when RTP is used, the server 1540 encapsulates the coded media bitstream into RTP packets according to an RTP payload format. Typically, each media type has a dedicated RTP payload format. It should be again noted that a system may contain more than one server 1540, but for the sake of simplicity, the following description only considers one server 1540.

If the media content is encapsulated in a container file for the storage 1530 or for inputting the data to the sender 1540, the sender 1540 may comprise or be operationally attached to a "sending file parser" (not shown in the figure). In particular, if the container file is not transmitted as such but at least one of the contained coded media bitstream is encapsulated for transport over a communication protocol, a sending file parser locates appropriate parts of the coded media bitstream to be conveyed over the communication protocol. The sending file parser may also help in creating the correct format for the communication protocol, such as packet headers and payloads. The multimedia container file may contain encapsulation instructions, such as hint tracks in the ISOBMFF, for encapsulation of the at least one of the contained media bitstream on the communication protocol.

The server 1540 may or may not be connected to a gateway 1550 through a communication network, which may e.g. be a combination of a CDN, the Internet and/or one or more access networks. The gateway may also or alternatively be referred to as a middle-box. For DASH, the gateway may be an edge server (of a CDN) or a web proxy. It is noted that the system may generally comprise any number gateways or alike, but for the sake of simplicity, the following description only considers one gateway 1550. The gateway 1550 may perform different types of functions, such as translation of a packet stream according to one communication protocol stack to another communication protocol stack, merging and forking of data streams, and manipulation of data stream according to the downlink and/or receiver capabilities, such as controlling the bit rate of the forwarded stream according to prevailing downlink network conditions. The gateway 1550 may be a server entity in various embodiments.

The system includes one or more receivers 1560, typically capable of receiving, de-modulating, and de-capsulating the transmitted signal into a coded media bitstream. The coded media bitstream may be transferred to a recording storage 1570. The recording storage 1570 may comprise any type of mass memory to store the coded media bitstream. The recording storage 1570 may alternatively or additionally comprise computation memory, such as random access memory. The format of the coded media bitstream in the recording storage 1570 may be an elementary self-contained bitstream format, or one or more coded media bitstreams may be encapsulated into a container file. If there are multiple coded media bitstreams, such as an audio stream and a video stream, associated with each other, a container file is typically used and the receiver 1560 comprises or is attached to a container file generator producing a container file from input streams. Some systems operate "live," i.e. omit the recording storage 1570 and transfer coded media bitstream from the receiver 1560 directly to the decoder 1580. In some systems, only the most recent part of the recorded stream, e.g., the most recent 10-minute excerption of the recorded stream, is maintained in the recording storage 1570, while any earlier recorded data is discarded from the recording storage 1570.

The coded media bitstream may be transferred from the recording storage 1570 to the decoder 1580. If there are many coded media bitstreams, such as an audio stream and a video stream, associated with each other and encapsulated into a container file or a single media bitstream is encapsulated in a container file e.g. for easier access, a file parser (not shown in the figure) is used to decapsulate each coded media bitstream from the container file. The recording storage 1570 or a decoder 1580 may comprise the file parser, or the file parser is attached to either recording storage 1570 or the decoder 1580. It should also be noted that the system may include many decoders, but here only one decoder 1570 is discussed to simplify the description without a lack of generality The coded media bitstream may be processed further by a decoder 1570, whose output is one or more uncompressed media streams. Finally, a renderer 1590 may reproduce the uncompressed media streams with a loudspeaker or a display, for example. The receiver 1560, recording storage 1570, decoder 1570, and renderer 1590 may reside in the same physical device or they may be included in separate devices.

A sender 1540 and/or a gateway 1550 may be configured to perform switching between different representations e.g. for switching between different viewports of 360-degree video content, view switching, bitrate adaptation and/or fast start-up, and/or a sender 1540 and/or a gateway 1550 may be configured to select the transmitted representation(s). Switching between different representations may take place for multiple reasons, such as to respond to requests of the receiver 1560 or prevailing conditions, such as throughput, of the network over which the bitstream is conveyed. In other words, the receiver 1560 may initiate switching between representations. A request from the receiver can be, e.g., a request for a Segment or a Subsegment from a different representation than earlier, a request for a change of transmitted scalability layers and/or sub-layers, or a change of a rendering device having different capabilities compared to the previous one. A request for a Segment may be an HTTP GET request. A request for a Subsegment may be an HTTP GET request with a byte range. Additionally or alternatively, bitrate adjustment or bitrate adaptation may be used for example for providing so-called fast start-up in streaming services, where the bitrate of the transmitted stream is lower than the channel bitrate after starting or random-accessing the streaming in order to start playback immediately and to achieve a buffer occupancy level that tolerates occasional packet delays and/or retransmissions. Bitrate adaptation may include multiple representation or layer up-switching and representation or layer down-switching operations taking place in various orders.

A decoder 1580 may be configured to perform switching between different representations e.g. for switching between different viewports of 360-degree video content, view switching, bitrate adaptation and/or fast start-up, and/or a decoder 1580 may be configured to select the transmitted representation(s). Switching between different representations may take place for multiple reasons, such as to achieve faster decoding operation or to adapt the transmitted bitstream, e.g. in terms of bitrate, to prevailing conditions, such as throughput, of the network over which the bitstream is conveyed. Faster decoding operation might be needed for example if the device including the decoder 1580 is multitasking and uses computing resources for other purposes than decoding the video bitstream. In another example, faster decoding operation might be needed when content is played back at a faster pace than the normal playback speed, e.g. twice or three times faster than conventional real-time playback rate.

In the above, some embodiments have been described with reference to MSE, e.g. as an example of a selection criterion of a prediction mode. It needs to be understood that other metrics, such as sum of absolute differences (SAD), sum of squared differences (SSD), sum of absolute transformed differences (SATD), could similarly be used. Similarly, a Lagrangian cost function combining rate and any distortion metrics could be similarly used.

In the above, some embodiments have been described with reference to and/or using terminology of HEVC. It needs to be understood that embodiments may be similarly realized with any video encoder and/or video decoder.

The embodiments of the invention described above describe the codec in terms of separate encoder and decoder apparatus in order to assist the understanding of the processes involved. However, it would be appreciated that the apparatus, structures and operations may be implemented as a single encoder-decoder apparatus/structure/operation. Furthermore, it is possible that the coder and decoder may share some or all common elements.

Although the above examples describe embodiments of the invention operating within a codec within an electronic device, it would be appreciated that the invention as defined in the claims may be implemented as part of any video codec. Thus, for example, embodiments of the invention may be implemented in a video codec which may implement video coding over fixed or wired communication paths.

Thus, user equipment may comprise a video codec such as those described in embodiments of the invention above. It shall be appreciated that the term user equipment is intended to cover any suitable type of wireless user equipment, such as mobile telephones, portable data processing devices or portable web browsers.

Furthermore elements of a public land mobile network (PLMN) may also comprise video codecs as described above.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

The invention claimed is:

1. A method comprising:
   obtaining a configuration of at least one neural network comprising a plurality of intra-prediction mode agnostic layers and one or more intra-prediction mode specific layers, the one or more intra-prediction mode specific layers corresponding to different intra-prediction modes;
   obtaining at least one input video frame comprising a plurality of blocks;
   determining to encode one or more blocks using intra prediction;
   determining an intra-prediction mode for said one or more blocks;
   grouping blocks having same intra-prediction mode into groups, a group being assigned with a computation path among the plurality of intra-prediction mode agnostic layers and the one or more intra-prediction mode specific layers;
   training at least one of the plurality of intra-prediction mode agnostic layers or the one or more intra-prediction mode specific layers of the neural networks based on a training loss between an output of the neural networks relating to a group of blocks and ground-truth blocks, wherein the ground-truth blocks comprise at least one of blocks of the input video frame or reconstructed blocks; and
   encoding a block using a computation path assigned to an intra-prediction mode for the block.

2. The method according to claim 1, further comprising:
   indicating, in or along a bitstream comprising the encoded group of blocks, information indicative of a group of blocks defined as training blocks.

3. The method according to claim 1, wherein the configuration of the at least one neural networks comprises a mode agnostic section of at least one layer and a mode specific section of the at least one layer.

4. The method according to claim 1, wherein the configuration of the at least one neural network comprises an initial section of initial layers which are trained for a plurality of intra-prediction modes, and a plurality of final layers which are specific to an intra-prediction mode.

5. The method according to claim 1, wherein the configuration of the at least one neural networks comprises a plurality of different neural networks for different intra-prediction modes.

6. The method according to claim 1, wherein a first learning rate is used in training the plurality of intra-prediction mode agnostic layers and a second learning rate is used for training the one or more intra-prediction mode specific layers, and wherein the second learning rate is lower than the first learning rate.

7. The method according to claim 1, wherein the information indicative of the group of blocks defined as training blocks comprises a quantization parameter, wherein the group of blocks is defined as a training block if the quantization parameter is lower than or equal to a threshold.

8. A method comprising:
   obtaining a configuration of at least one neural network comprising a plurality of intra-prediction mode agnostic layers and one or more intra-prediction mode specific layers corresponding to different intra-prediction modes;
   obtaining a bitstream comprising an encoded video frame, wherein the encoded video frame comprises a plurality of blocks;
   decoding, from or along the bitstream information indicative of a group of blocks defined as training blocks;
   decoding the training blocks into reconstructed blocks;
   training the plurality of intra-prediction mode agnostic layers and/or the one or more intra-prediction mode specific layers of the at least one neural network based on a training loss between an output of the neural networks relating to a group of blocks and the reconstructed blocks; and
   decoding an encoded block using a computation path assigned to an intra-prediction mode of the encoded block.

9. The method according to claim 8, wherein the configuration of at least one neural network comprises a pre-trained neural network, and the method further comprises:
   using blocks of the input video frame as ground-truth blocks.

10. An apparatus comprising at least one processor and at least one memory, said at least one memory including computer program code, the at least one memory and the computer program code configured to, with the at least one processor, cause the apparatus at least to perform:
    obtain a configuration of at least one neural network comprising a plurality of intra-prediction mode agnostic layers and one or more intra-prediction mode specific layers, the one or more intra-prediction mode specific layers corresponding to different intra-prediction modes;
    obtain at least one input video frame comprising a plurality of blocks;
    determine to encode one or more blocks using intra prediction;
    determine an intra-prediction mode for said one or more blocks;
    group blocks having same intra-prediction mode into groups, a group being assigned with a computation path among the plurality of intra-prediction mode agnostic layers and the one or more intra-prediction mode specific layers;
    train at least one of the plurality of intra-prediction mode agnostic layers or the one or more intra-prediction mode specific layers of the neural networks based on a training loss between an output of the neural networks relating to a group of blocks and ground-truth blocks, wherein the ground-truth blocks comprise at least one of blocks of the input video frame or reconstructed blocks; and
    encode a block using a computation path assigned to an intra-prediction mode for the block.

11. The apparatus according to claim 10, wherein the configuration of at least one neural network comprises a pre-trained neural network, and wherein the at least one memory and the computer program code are further configured to, with the at least one processor, further cause the apparatus to: use blocks of the input video frame as the ground-truth blocks.

12. The apparatus according to claim 10, wherein the at least one memory and the computer program code are further configured to, with the at least one processor, further cause the apparatus to: indicate, in or along a bitstream comprising the encoded group of blocks, information indicative of a group of blocks defined as training blocks.

13. The apparatus according to claim 10, wherein the configuration of neural networks comprises a mode agnostic section of layer(s) and a mode specific section of layer(s).

14. The apparatus according to claim 10, wherein the configuration of neural networks comprises an initial section of initial layers which are trained for a plurality of intra-prediction modes, and a plurality of final layers which are specific to an intra-prediction mode.

15. The apparatus according to claim 10, wherein the configuration of neural networks comprises a plurality of different neural networks for different intra-prediction modes.

16. The apparatus according to claim 10, wherein a first learning rate is used in training the intra-prediction mode agnostic layers and a second learning rate is used for training the intra-prediction mode specific layers, and wherein the second learning rate is lower than the first learning rate.

17. The apparatus according to claim 10, wherein the information indicative of the group of blocks defined as training blocks comprises a quantization parameter, wherein the group of blocks is defined as a training block if the quantization parameter is lower than or equal to a threshold.

18. The apparatus according to claim 10, wherein an input to the neural network comprises a plurality of reconstructed blocks of the input video frame.

19. The apparatus according to claim 10, wherein an epoch or an iteration of the training the plurality of intra-prediction mode agnostic layers and/or the one or more intra-prediction mode specific layers is based on blocks associated with a plurality of intra-prediction modes.

20. An apparatus comprising at least one processor and at least one memory, said at least one memory including computer program code, the at least one memory and the computer program code configured to, with the at least one processor, cause the apparatus at least to perform: obtain a configuration of at least one neural network comprising a plurality of intra-prediction mode agnostic layers and one or more intra-prediction mode specific layers corresponding to different intra-prediction modes;
    obtain a bitstream comprising an encoded video frame, wherein the encoded video frame comprises a plurality of blocks;
    decode, from or along the bitstream information indicative of a group of blocks defined as training blocks;
    decode the training blocks into reconstructed blocks;
    train the plurality of intra-prediction mode agnostic layers and/or the one or more intra-prediction mode specific layers of the at least one neural network based on a training loss between an output of the neural networks relating to a group of blocks and the reconstructed blocks; and
    decode an encoded block using a computation path assigned to an intra-prediction mode of the encoded block.

\* \* \* \* \*